United States Patent
Lee et al.

(10) Patent No.: US 10,197,413 B2
(45) Date of Patent: Feb. 5, 2019

(54) IMAGE PROCESSING APPARATUS, IMAGE PROCESSING METHOD, COMPUTER PROGRAM AND COMPUTER READABLE RECORDING MEDIUM

(71) Applicant: THINKWARE CORPORATION, Seongnam-si, Gyeonggi-do (KR)

(72) Inventors: Ki Wook Lee, Seongnam-si (KR); Hye Kyung Byun, Seongnam-si (KR); Tae Kyu Han, Seongnam-si (KR); Shin Hyoung Kim, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 0 days.

(21) Appl. No.: 15/822,705

(22) Filed: Nov. 27, 2017

(65) Prior Publication Data
US 2018/0149487 A1 May 31, 2018

(30) Foreign Application Priority Data

Nov. 26, 2016 (KR) .................. 10-2016-0158832
Nov. 8, 2017 (KR) .................. 10-2017-0148115

(51) Int. Cl.
*G01C 21/36* (2006.01)
*G06T 5/50* (2006.01)
(Continued)

(52) U.S. Cl.
CPC ....... *G01C 21/3602* (2013.01); *G01C 21/005* (2013.01); *G06F 17/30002* (2013.01);
(Continued)

(58) Field of Classification Search
CPC .......... G01C 21/36; G01C 21/00; G06T 5/50; G06T 1/00
(Continued)

(56) References Cited

U.S. PATENT DOCUMENTS 6,047,234 A    4/2000 Cherveny et al.
7,089,110 B2 *  8/2006 Pechatnikov .......... G01C 21/26
                                            340/988
(Continued)

FOREIGN PATENT DOCUMENTS

JP    2002-243469 A    8/2002
WO   2009/059766 A1   5/2009

OTHER PUBLICATIONS

Aparna Taneja et al.: "Image Based Detection of Geometric Changes in Urban Environments"; 2011 IEEE International Conference on Computer Vision (ICCV); Nov. 6, 2011; pp. 2336-2343.
(Continued)

*Primary Examiner* — Tan Q Nguyen
(74) *Attorney, Agent, or Firm* — Novick, Kim & Lee, PLLC; Sang Ho Lee

(57) ABSTRACT

Provided is an image processing method. The image processing method includes receiving images acquired from a plurality of vehicles positioned on a road; storing the received images according to acquisition information of the received images; determining a reference image and a target image based on images having the same acquisition information among the stored images; performing an image registration using a plurality of feature points extracted from each of the determined reference image and target image; performing a transparency process for each of the reference image and the target image which are image-registered; extracting static objects from the transparency-processed image; and comparing the extracted static objects with objects on map data which is previously stored and updating the map data when the objects on the map data which is previously stored and the extracted static objects are different from each other.

20 Claims, 18 Drawing Sheets

(51) Int. Cl.
  *G01C 21/00* (2006.01)
  *G06F 17/30* (2006.01)
  *G06T 1/00* (2006.01)
  *G06T 7/20* (2017.01)
  *G06T 7/254* (2017.01)

(52) U.S. Cl.
  CPC ............. *G06T 1/0007* (2013.01); *G06T 5/50* (2013.01); *G06T 7/20* (2013.01); *G06T 7/254* (2017.01); *G06T 2207/10004* (2013.01); *G06T 2207/20221* (2013.01); *G06T 2207/30252* (2013.01)

(58) Field of Classification Search
  USPC ........................................................ 701/450
  See application file for complete search history.

(56) References Cited

U.S. PATENT DOCUMENTS

| | | | | |
|---|---|---|---|---|
| 2006/0195858 | A1* | 8/2006 | Takahashi | G01C 21/3602 725/19 |
| 2007/0088497 | A1* | 4/2007 | Jung | G01C 21/3647 348/113 |
| 2014/0297185 | A1* | 10/2014 | Lindner | G01C 21/3632 701/541 |

OTHER PUBLICATIONS

Emanuele Palazzolo et al.: "Change Detection in 3D Model Based on Camera Images"; IEEE Transactions on Consumer Electronics; Jan. 1, 2011; pp. 1465-1470.

\* cited by examiner

IMAGE PROCESSING APPARATUS, IMAGE PROCESSING METHOD, COMPUTER PROGRAM AND COMPUTER READABLE RECORDING MEDIUM

CROSS-REFERENCE TO RELATED APPLICATION

This application claims the priority and benefit of Korean Patent Application Nos. 10-2016-0158832 filed on Nov. 26, 2016 and 10-2017-0148115 filed on Nov. 8, 2017, with the Korean Intellectual Property Office, the disclosures of which are incorporated herein by reference.

BACKGROUND OF THE INVENTION

1. Field of the Invention

The present invention relates to an image processing apparatus, an image processing method, a computer program, and a computer readable recording medium, and more particularly, to an image processing apparatus, an image processing method, a computer program, and a computer readable recording medium for providing a map having high accuracy using images obtained through cameras.

2. Description of the Related Art

Although automakers are recently trying to implement an autonomous vehicle with a higher level of advanced driver assistance system (ADAS), they are facing limitations due to the technical problems of conventional systems using sensors such as cameras and radar. In order to overcome such a limitation, the automakers try to find a solution utilizing additional information system to implement the autonomous vehicle, and an example of the representative additional information system is a detailed map.

The detailed map refers to a map including information on positions and types of all fixed objects on the road, and the detailed map serves to complement performance of the sensor in a situation in which it is difficult for the sensor to normally operate. In a case in which information of the sensor is not correct due to obstacles or bad weather, the vehicle may complement the incorrect information by utilizing information of the detailed map.

Since the detailed map should provide information on the positions and types of all fixed geographic features on the road, it is important to quickly reflect accuracy of the map and changes of an actual road and the geographic features. However, when it is difficult to know the accurate information on the types of fixed geographic features due to the geographic features covered by a moving object, or changes in a road environment such as an installation of a traffic light, extending/closing of the road, a change in lane information, and the like occur, there is a problem that such information is not quickly reflected on the actual map. Therefore, a method capable of solving such a problem is required.

SUMMARY

An aspect of the present invention may provide an image processing apparatus, an image processing method, a computer program, and a computer readable recording medium for creating a map.

An aspect of the present invention may also provide an image processing apparatus, an image processing method, a computer program, and a computer readable recording medium for creating map data using images obtained by a camera mounted in a vehicle.

An aspect of the present invention may also provide an image processing apparatus, an image processing method, a computer program, and a computer readable recording medium for updating map data using images transmitted from vehicles positioned on a road.

According to an aspect of the present invention, an image processing method may include receiving images acquired from a plurality of vehicles positioned on a road; storing the received images according to acquisition information of the received images; determining a reference image and a target image based on images having the same acquisition information among the stored images; performing an image registration using a plurality of feature points extracted from each of the determined reference image and target image; performing a transparency process for each of the reference image and the target image which are image-registered; extracting static objects from the transparency-processed image; and comparing the extracted static objects with objects on map data which is previously stored and updating the map data when the objects on the map data which is previously stored and the extracted static objects are different from each other.

The performing of the image registration may include extracting the plurality of feature points from each of the determined reference image and target image; and performing the image registration for the determined images using the plurality of extracted feature points.

The plurality of feature points may be points at which image brightness value suddenly changes in the reference image or the target image and may be edges of pixels or corner points.

The transparency process may multiply R, G, and B pixel values of respective pixels included in the images for which the transparency process is to be performed by a predetermined value smaller than 1, and the predetermined value may be a reciprocal number of N, which is a total number of the images for which the transparency process is to be performed.

The acquisition information may include at least one of information on positions at which the images are photographed, information on angles at which the images are photographed, and information on directions in which the images are photographed.

The extracting of the plurality of feature points may include extracting a plurality of first feature points from the reference image; and extracting a plurality of second feature points from the target image.

The performing of the image registration may include performing a matching operation matching a first feature point group in which the plurality of first feature points are grouped and a second feature point group in which the plurality of second feature points are grouped; calculating a homography using information of matched pairs between the first feature point group and the second feature point group through the matching operation; converting the target image using the calculated homography; and registering the reference image and the converted target image.

The updating of the map data may include confirming position information of the extracted static objects; examining whether or not objects different from the extracted static objects exist at a position corresponding to the confirmed position information of the static objects in the map data which is previously stored; and updating the map data by reflecting the extracted static objects to the map data which is previously stored corresponding to the position information, when the different objects exist as a result of the examination.

The image processing method may further include transmitting the updated map data to the plurality of vehicles positioned on the road.

According to another aspect of the present invention, an image processing apparatus may include a receiving unit receiving images acquired from a plurality of vehicles positioned on a road; a storing unit storing the received images according to acquisition information of the received images; a controlling unit determining a reference image and a target image based on images having the same acquisition information among the stored images; and an image processing unit performing an image registration using a plurality of feature points extracted from each of the determined reference image and target image and performing a transparency process for each of the reference image and the target image which are image-registered, wherein the controlling unit extracts static objects from the transparency-processed image, compares the extracted static objects with objects on map data which is previously stored, and updates the map data when the objects on the map data which is previously stored and the extracted static objects are different from each other.

The image processing unit may generate one synthesized image by extracting the plurality of feature points from each of the determined reference image and target image and performing the image registration for the determined images using the plurality of extracted feature points.

The plurality of feature points may be points at which image brightness value suddenly changes in the reference image or the target image and be edges of pixels or corner points.

The transparency process may multiply R, G, and B pixel values of respective pixels included in the images for which the transparency process is to be performed by a predetermined value smaller than 1, and the predetermined value may be a reciprocal number of N, which is a total number of the images for which the transparency process is to be performed.

The acquisition information may include at least one of information on positions at which the images are photographed, information on angles at which the images are photographed, and information on directions in which the images are photographed.

The image processing unit may include a feature point extracting unit extracting a plurality of first feature points from the reference image and extracting a plurality of second feature points from the target image; a feature point matching unit performing a matching operation matching a first feature point group in which the plurality of first feature points are grouped and a second feature point group in which the plurality of second feature points are grouped; a homography calculating unit calculating a homography using information of matched pairs between the first feature point group and the second feature point group through the matching operation; an image registration unit converting the target image using the calculated homography and registering the reference image and the converted target image; and a transparency processing unit performing a transparency process for the registered images.

The controlling unit may confirm position information of the extracted static objects, examines whether or not objects different from the extracted static objects exist at a position corresponding to the confirmed position information of the static objects in the map data which is previously stored, and update the map data by reflecting the extracted static objects to the map data which is previously stored corresponding to the position information, when the different objects exists as a result of the examination.

According to another aspect of the present invention, an image processing method may include selecting images for the same region among a plurality of images photographed by a moving body; performing a transparency process for each of the selected images; registering the transparency-processed images; and determining static objects in the registered image based on transparencies of objects included in the registered image.

In the selecting of the images, images having the same acquisition information for each of the plurality of images may be selected, and the acquisition information may include at least one of information on positions at which the images are photographed, information on angles at which the images are photographed, and information on directions in which the images are photographed.

The determining of the static objects may include calculating standard deviations of a pixel value of the registered image, a pixel value of the reference image, and pixel values of target images for each of pixels; and determining pixels of which the calculated standard deviation is a predetermined value or less as pixels for the static objects and determining pixels of which the calculated standard deviation exceeds the predetermined value as pixels for the dynamic objects.

The image processing method may further include excluding the dynamic objects from the registered image, confirming position information of the static objects in the registered image from which the dynamic objects are excluded, and updating map data based on the position information of the static objects.

According to another exemplary embodiment of the present invention, a computer readable recording medium in which a program for executing an image processing method is recorded may be provided.

According to another exemplary embodiment of the present invention, a computer program stored in a computer readable recording medium to execute an image processing method may be provided.

DETAILED DESCRIPTION

Figure 1:
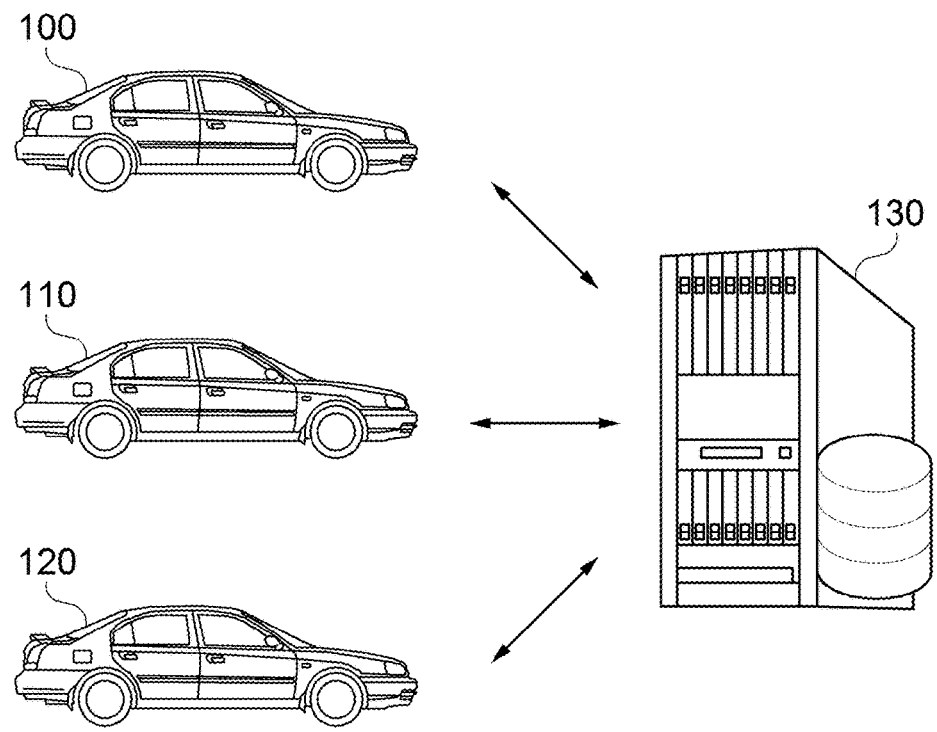
FIG. 1 is a diagram illustrating a map creating system according to an exemplary embodiment of the present invention.

The following description illustrates only a principle of the present invention. Therefore, those skilled in the art may implement the principle of the present invention and devise various apparatuses included in the spirit and scope of the present invention although not clearly described or shown in the present specification. In addition, it is to be understood that all conditional terms and exemplary embodiments mentioned in the present specification are obviously intended only to allow those skilled in the art to understand a concept of the present invention in principle, and the present invention is not limited to exemplary embodiments and states particularly mentioned as such.

Further, it is to be understood that all detailed descriptions mentioning specific exemplary embodiments of the present invention as well as principles, aspects, and exemplary embodiments of the present invention are intended to include structural and functional equivalences thereof. Further, it is to be understood that these equivalences include an equivalence that will be developed in the future as well as an equivalence that is currently well-known, that is, all devices devised so as to perform the same function regardless of a structure.

Therefore it is to be understood that, for example, a block diagram of the present specification shows a conceptual aspect of an illustrative circuit for embodying a principle of the present invention. Similarly, it is to be understood that all flowcharts, state transition views, pseudo-codes, and the like show various processes that may tangibly embodied in a computer-readable medium and that are executed by computers or processors regardless of whether or the computers or the processors are clearly illustrated.

Functions of various devices including processors or functional blocks represented as concepts similar to the processors and illustrated in the accompanying drawings may be provided by hardware having capability to execute appropriate software as well as dedicated hardware. When the functions are provided by the processors, the above-mentioned functions may be provided by a single dedicated processor, a single shared processor, or a plurality of individual processors, in which some of them may be shared.

In addition, terms mentioned as a processor, a control, or a concept similar to the processor or the control should not be interpreted to exclusively cite hardware having capability to execute software, but should be interpreted to implicitly include digital signal processor (DSP) hardware and a read only memory (ROM), a random access memory (RAM), and a non-volatile memory for storing software without being limited thereto. The above-mentioned terms may also include well-known other hardware.

In the claims of the present specification, components represented as means for performing functions mentioned in a detailed description are intended to include all methods for performing functions including all types of software including, for example, a combination of circuit devices performing these functions, firmware/micro codes, or the like, and are coupled to appropriate circuits for executing the software. It is to be understood that since functions provided by variously mentioned means are combined with each other and are combined with a scheme demanded by the claims in the inventions defined by the claims, any means capable of providing these functions are equivalent to means recognized from the present specification.

The above-mentioned objects, features, and advantages will become obvious from the following detailed description provided in relation to the accompanying drawings. Therefore, those skilled in the art to which the present invention pertains may easily practice a technical idea of the present invention. Further, in describing the present invention, in the case in which it is judged that a detailed description of a well-known technology associated with the present invention may unnecessarily make unclear the gist of the present invention, it will be omitted.

Hereinafter, various exemplary embodiments of the present invention will be described in detail with reference to the accompanying drawings.

FIG. 1 is a diagram illustrating a map creating system 10 according to an exemplary embodiment of the present invention.

Referring to FIG. 1, a map creating system 10 according to the present invention includes first to third vehicles 100, 110, and 120, and an image processing apparatus 130.

The first to third vehicles 100, 110, and 120 are mounted with cameras, which are apparatuses capable of obtaining images, and transmit the obtained images to the image processing apparatus 130 while being positioned on a road. Although FIG. 1 illustrates the vehicles, other means other than the vehicle, for example, a movable means such as a person, a bicycle, a ship, a train, or the like, may also be implemented as long as they may transmit the images obtained by photographing the subjects on the road or around the road to the image processing apparatus 130. Such a movable means will be collectively referred to as a moving body. Hereinafter, a case in which the moving body is the vehicle will be described as an example, for convenience of explanation.

Meanwhile, the subjects described above include fixed static objects that may be reflected in map data such as bridges, buildings, roads, sidewalks, road construction marks, speed bumps, crosswalks, intersections, traffic lights, median strips, bus stops, directional signs, and the like.

Further, the image processing apparatus 130 according to an exemplary embodiment of the present invention may process images received from the first to third vehicles 100, 110, and 120 to create an electronic map, and may transmit the created electronic map to other vehicles positioned on the road including the first to third vehicles 100, 110, and 120.

Further, the image processing apparatus 130 according to an exemplary embodiment of the present invention may also be a map creating server.

Figure 2:
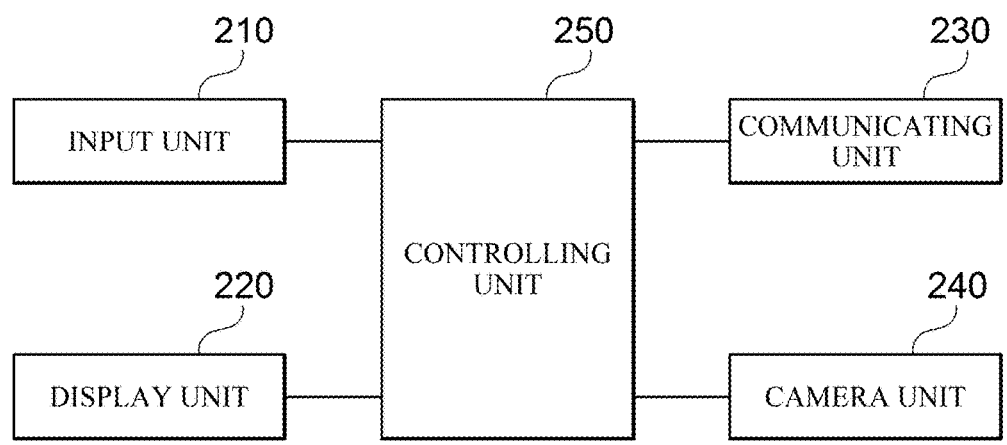
FIG. 2 is a diagram illustrating a block configuration of an electronic apparatus mounted in first to third vehicles according to an exemplary embodiment of the present invention.

FIG. 2 is a diagram illustrating a block configuration of an electronic apparatus 200 mounted in the first to third vehicles 100, 110, and 120 according to an exemplary embodiment of the present invention.

Referring to FIG. 2, an electronic apparatus 200 according to the present invention includes an input unit 210, a communicating unit 230, a camera unit 240, and a controlling unit 250, and may further include a display unit 220. As an example, the electronic apparatus 200, which is an apparatus capable of photographing an image, may be a mobile terminal such as a smartphone including a vehicle video camera or a camera. Further, the electronic apparatus 200 may be embedded in the vehicle so as to be connected to an electronic controller unit (ECU) of the vehicle through controller area network (CAN) communication, and may also be a mobile terminal which may be held in the vehicle such as the smartphone of the user and may transmit and receive data by being connected to a mobile communication system.

The inputting unit 210 may receive a command or the like for performing an operation from the user and may include a key-pad, a dome switch, a touch pad (resistive/capacitive), a jog wheel, a jog switch, a push switch, or the like.

The communicating unit 230 may transmit the image photographed by the camera unit 240 to the image processing apparatus 300, or transmit the photographed image to other communication means included in the vehicle. The communicating unit 230 may perform communication in a wired communication scheme as well as various wireless communication schemes such as Bluetooth, Wi-Fi, wireless broadband, 3rd generation (3G), WCDMA scheme, long term evolution (LTE), and a 4th generation (4G) communication schemes.

The camera unit 240 converts an image signal (e.g., light) received from the outside into a specific electric signal to generate image data. For example, the camera unit 240 may obtain image data of the inside and outside of the vehicle related to the driving of the vehicle.

The display unit 220 may output visual information to the user, and may output a map or an image photographed during the driving. The display unit 220 and the input unit 210 may be integrally formed as a touch panel or a touch screen.

The controlling unit 250 generally controls the electronic apparatus 200, for example, the controlling unit controls the camera unit 240 so as to photograph the image, and transmits the photographed image to the image processing apparatus 130 through the communicating unit 230. In addition, since the controlling unit 250 also transmits acquisition information including at least one of photographed position information of the image, photographed angle information thereof, and photographed direction information thereof when transmitting the image photographed by the camera unit 240 to the image processing unit 300 through the communicating unit 230, the image processing apparatus 300 according to the present invention may classify the received images according to the acquisition information, thereby making it possible to quickly update the map data only for a point at which the static object is changed. Further, the controlling unit 250 may perform a camera calibration process for adjusting camera parameters for the image photographed by the camera unit 240 and transmit it to the image processing apparatus 300 through the communicating unit 230.

Meanwhile, the electronic apparatus 200 mounted in the first to third vehicles 100, 110, and 120 may photograph the object in units of predetermined time, and transmit images of the photographed object to the image processing apparatus 300. As an example, the electronic apparatus 200 may photograph the object in unit of one minute and transmit images of the photographed object to the image processing apparatus 300. Since the images of the photographed object include information on a photographed time and place, the photographed images may be classified by the same place.

Further, according to an exemplary embodiment of the present invention, the controlling unit 250 of the electronic apparatus 200 may correct parameters such as positions, angles, features, and the like of the cameras installed in the respective vehicles through camera calibration. The reason for performing such a camera calibration process is that the photographed place and target of the images photographed by the cameras are the same as each other, but installation heights, angles, and the like of the cameras photographing the respective images are different from each other, and therefore, an image registration may be easily performed only by correcting such characteristic parameters of the camera.

Hereinafter, it is assumed that since the electronic apparatus 200 is mounted in the first to third vehicles 100, 110, and 120, the first to third vehicles 100, 110, and 120 photograph the images and transmit the photographed images to the image processing apparatus 130.

Figure 3:
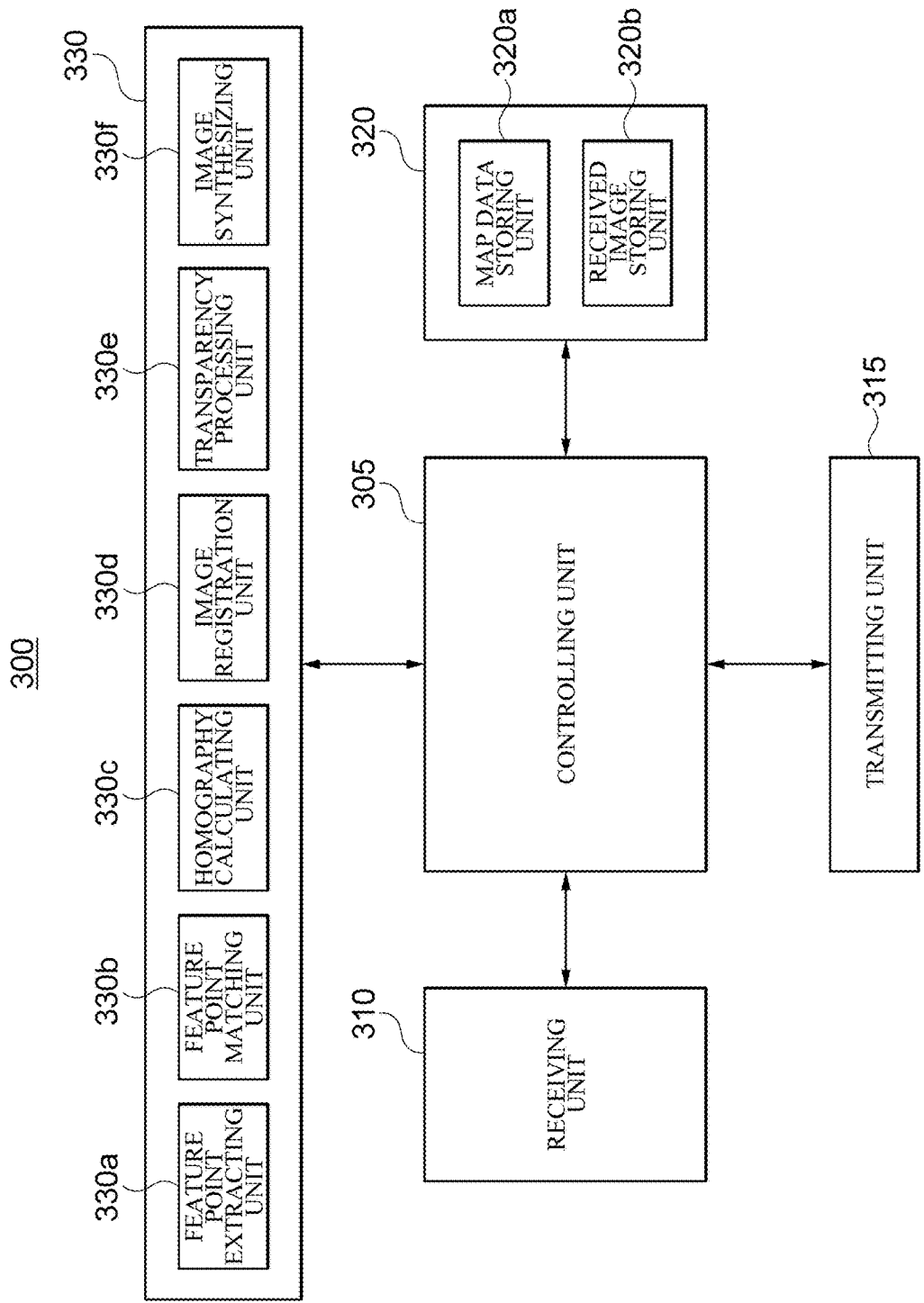
FIG. 3 is a diagram illustrating a block configuration of an image processing apparatus according to an exemplary embodiment of the present invention.

FIG. 3 is a block configuration of an image processing apparatus 300 according to an exemplary embodiment of the present invention. Referring to FIG. 3, the image processing apparatus 300 according to the present invention includes all or some of a controlling unit 305, a receiving unit 310, a transmitting unit 315, a storing unit 320, and an image processing unit 330.

The receiving unit 310 receives images acquired by the cameras mounted in a plurality of vehicles positioned on the road and acquisition information including at least one of information on positions at which the acquired images are photographed, information on angles at which the acquired images are photographed, and information on direction in which the acquired images are photographed through wireless communication such as long term evolution (LTE) or Wi-Fi, or wired communication.

The reason that the receiving unit 310 receives the acquired information other than the images is to allow the controlling unit 305 to easily classify the acquired images for image processing. Specifically, since the images acquired at the same point may have different photographing directions and angles, it is preferable that the controlling unit 305 classifies the images in consideration of the different photographing direction and angles and then performs the image processing according to an exemplary embodiment of the present invention.

For example, when the vehicle enters an intersection, the image processing apparatus 300 according to the exemplary embodiment of the present invention should be able to confirm whether the acquired image is an image acquired while the vehicle enters the intersection in either direction, so that the target images may be accurately selected.

That is, in the case of the intersection of four directions, since the vehicle may acquire the images while entering in the four directions, respectively, it is possible to accurately create or update map data around the intersection only in a case in which the image processing apparatus 300 may distinguish the photographed directions of the respective images.

Further, in a case in which the image processing apparatus 300 according to the exemplary embodiment of the present invention considers the information on the photographed angles of the acquired images, it is possible to create or update the map data through a more accurate image processing.

The transmitting unit 315 transmits the map data updated or the map data stored in the storing unit 320 by the controlling unit 305 to the electronic apparatus 200 of the vehicle of the user or the mobile terminal of the user by a control of the controlling unit 305.

The controlling unit 305 classifies the map data and the images received through the receiving unit 310 according to the acquired information of the received images and stores them in the storing unit 320. The map data is stored in a map data storing unit 320*a* as map data which is created previously, and the received images are each stored in a received image storing unit 320*b*. The controlling unit 305 may perform the image processing for images having the same position information, direction information, or the like using the classified and stored images, according to the exemplary embodiment of the present invention. Here, the storing unit 320 may be implemented as an embedded type of storage element such as a random access memory (RAM), a flash memory, a read only memory (ROM), an erasable programmable ROM (EPROM), an electronically erasable and programmable ROM (EEPROM), a register, a hard disk, a removable disk, a memory card, or the like, as well as a removable type of storage element such as a USB memory, or the like.

Such a storing unit 320 may be implemented within the image processing apparatus 300, and may be implemented in a type of external database (DB) server connected to the image processing apparatus 300.

Meanwhile, the controlling unit 305 determines a reference image and a target image based on images having the same acquired information among the images stored in the received image storing unit 320*b*, performs an image registration using a plurality of feature points extracted from the determined reference image and target image, respectively, and controls the image processing unit 330 so that a transparency process is performed for the image registered images. Here, the reference image refers to an image that is a reference for the image registration, and the target image refers to an image that is a target for the image registration.

Further, the controlling unit 305 registers the images transparency-processed by the image processing unit 330, and controls the image processing unit 330 to detect a static object region from the registered image. In this case, the image processing unit 330 may each calculate standard deviations of a pixel value of the registered image, a pixel value of the acquired reference image, and pixel values of the target images converted according to a homography for each of the pixels, and may detect a static object region from the registered image based on the calculated standard deviation.

In addition, the controlling unit 305 compares detected static objects with objects on the map data which is previously stored, and updates the map data stored in the map data storing unit 320*a*, when the objects on the map data which is previously stored are different from the extracted static objects.

Meanwhile, the image processing unit 330 may each calculate standard deviations of a pixel value of the registered image, a pixel value of the acquired reference image, and pixel values of the target images converted according to a homography for each of the pixels, and may detect a dynamic static object region from the registered image based on the calculated standard deviation. In this case, the controlling unit 305 may exclude the detected dynamic object from the registered image. In addition, the controlling unit 305 may confirm position information of the static object in the registered image from which the dynamic object is excluded, and may update the map data based on the position information of the static object.

The image processing unit 330 in FIG. 3 calculates a homography by extracting feature points between the acquired images and matching the feature points between the respective images to calculate the matched feature points having common feature points. In addition, the image processing unit 330 registers the images acquired by using the calculated homography.

The image processing unit 330 according to an exemplary embodiment of the present invention includes all or some of a feature point extracting unit 330*a*, a feature point matching unit 330*b*, a homography calculating unit 330*c*, an image registration unit 330*d*, a transparency processing unit 330*e*, and an image synthesizing unit 330*f*.

Here, the image processing unit 330 may be implemented in a separate module using software, hardware, or a combination thereof. As an example, according to a hardware implementation, the image processing unit 330 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electrical units for performing other functions.

Figure 4:
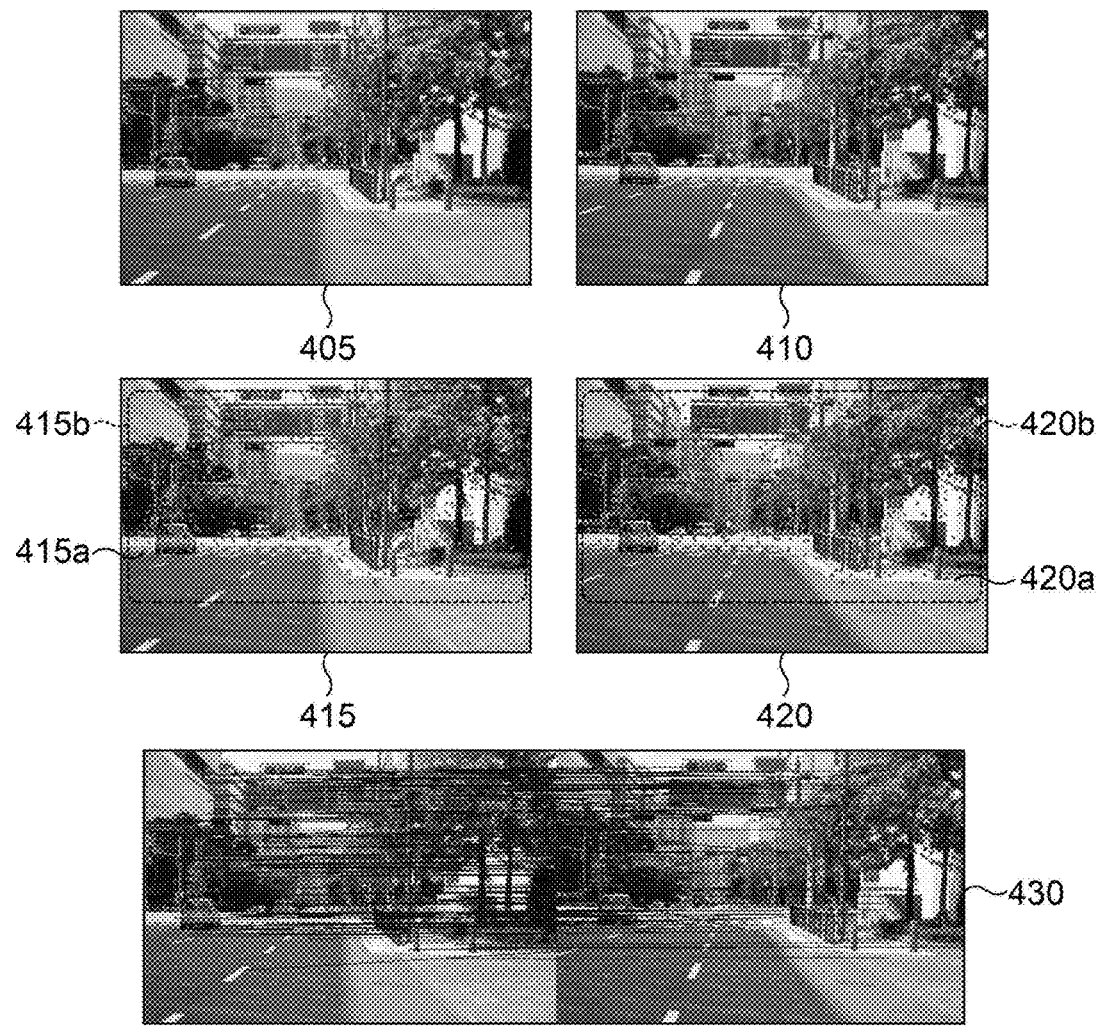
FIG. 4 is a diagram illustrating operations of a feature point extracting unit and a feature point matching unit of an image processing unit according to an exemplary embodiment of the present invention.
Figure 5:
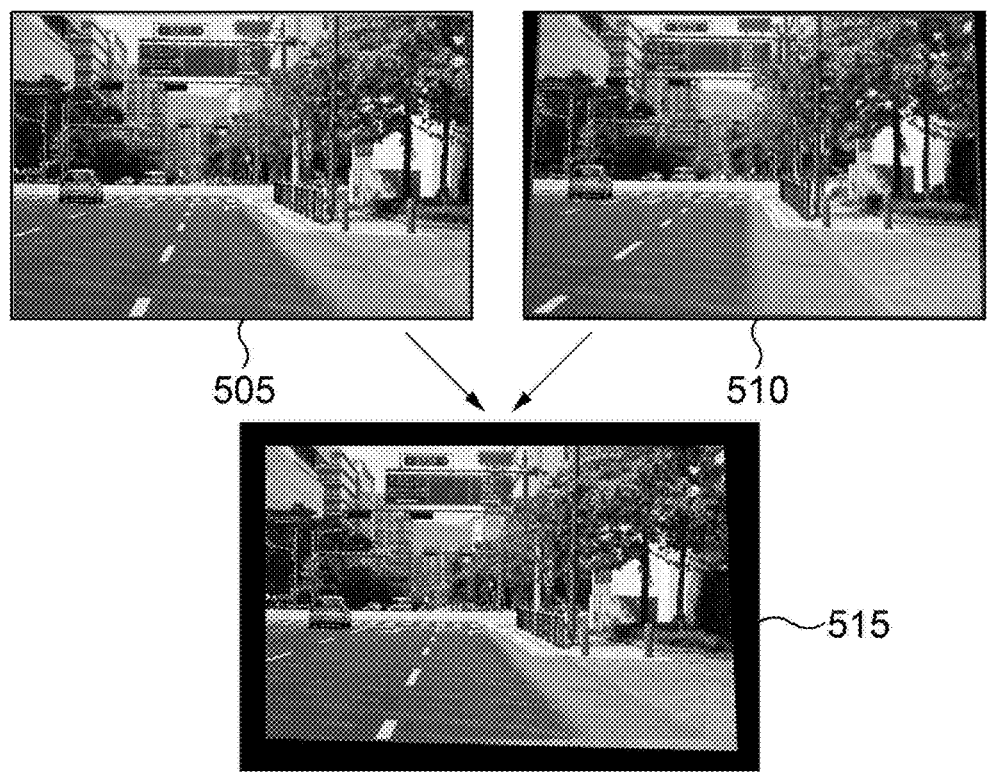
FIG. 5 is a diagram illustrating a process of matching a reference image with a target image according to a feature point matching described in FIG. 4 according to an exemplary embodiment of the present invention.

An operation of the image processing unit 330 according to an exemplary embodiment of the present invention will be described with reference to FIGS. 4 to 12. FIG. 4 is a diagram illustrating operations of a feature point extracting unit 330*a* and a feature point matching unit 330*b* of an image processing unit 330 according to an exemplary embodiment of the present invention and FIG. 5 is a diagram illustrating a process of matching a reference image with a target image according to a feature point matching described in FIG. 4 according to an exemplary embodiment of the present invention.

Figure 6:
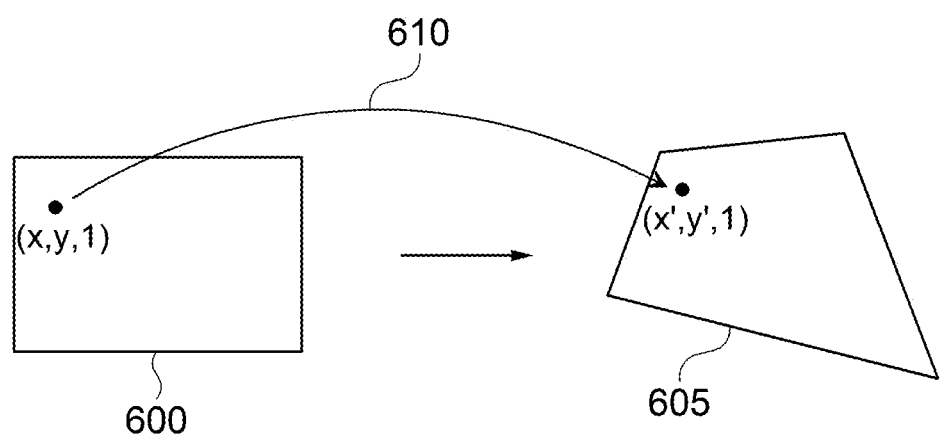
FIG. 6 is a diagram illustrating a matching relationship between the reference image and the target image by a homography calculated by a homography calculating unit of the image processing unit according to an exemplary embodiment of the present invention.

FIG. 6 is a diagram illustrating a matching relationship between the reference image and the target image by a homography calculated by a homography calculating unit 330*c* of the image processing unit 330 according to an exemplary embodiment of the present invention.

Figure 7:
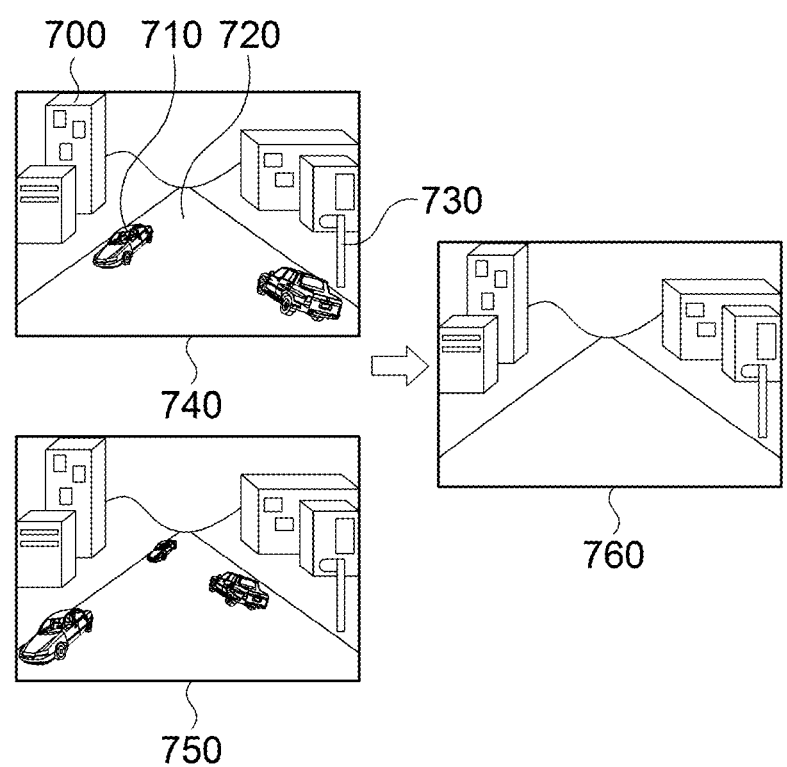
FIG. 7 is a diagram illustrating a distinction between a static object and a dynamic object according to an exemplary embodiment of the present invention.
Figure 8:
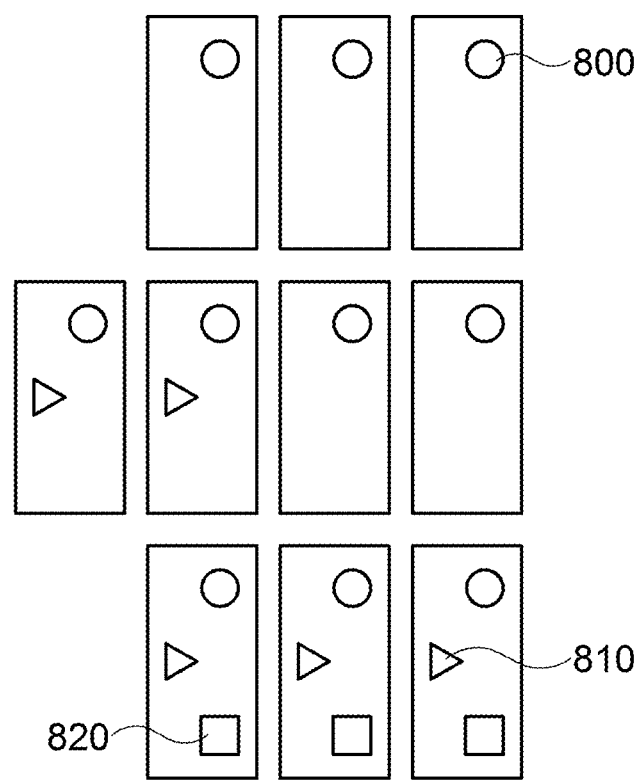
FIGS. 8 to 11 are diagrams illustrating a transparency process according to an exemplary embodiment of the present invention.

FIG. 7 is a diagram illustrating a distinction between a static object and a dynamic object according to an exemplary embodiment of the present invention. FIGS. 8 to 11 are diagrams illustrating a transparency process according to an exemplary embodiment of the present invention.

Figure 12:
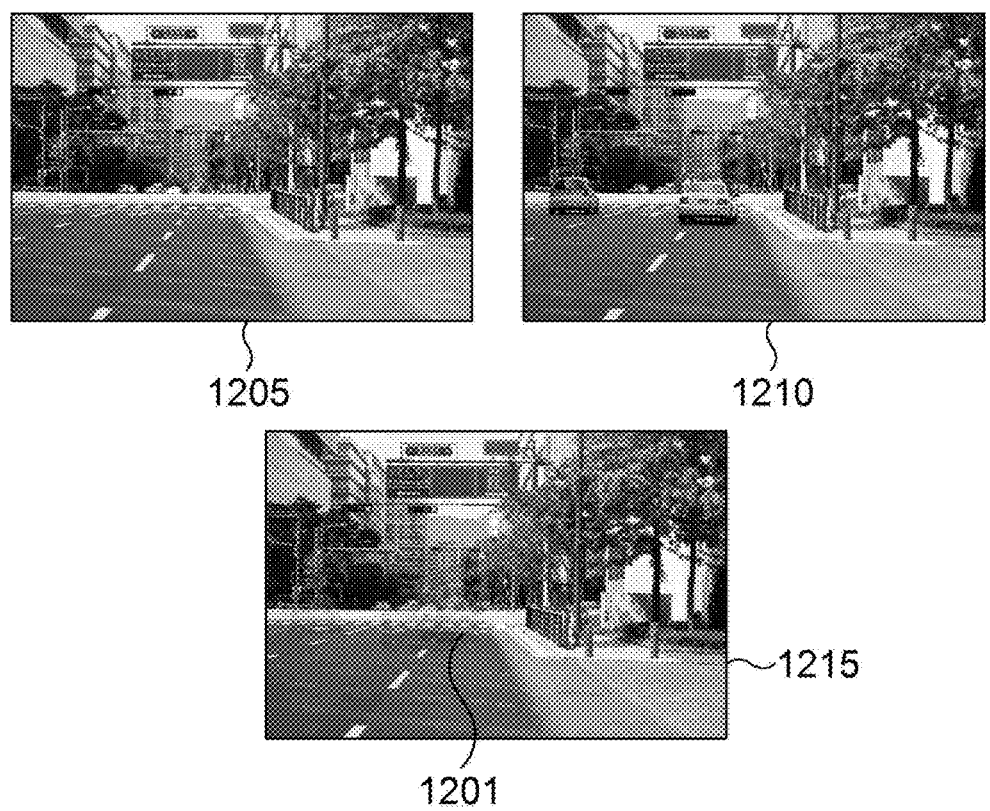
FIG. 12 is a diagram illustrating image processing results for the reference image and the target image according to an exemplary embodiment of the present invention.

FIG. 12 is a diagram illustrating image processing results for the reference image and the target image according to an exemplary embodiment of the present invention. The feature point extracting unit 330*a* extracts a plurality of feature points from each of the reference image and the target image determined by the controlling unit 305. Here, the plurality of feature points extracted from the reference image and the target image, which are points at which an image brightness value suddenly changes in the reference image or the target image, may be edges of pixels or corner points. Specifically, an operation of extracting the feature points by the feature point extracting unit 330a according to an exemplary embodiment of the present invention will be described with reference to FIG. 4.

In FIG. 4, reference numerals 405 and 410 denote images photographed at the same place and denotes images in which the camera calibration process is completed. It is assumed in FIG. 4 that the image of reference numeral 405 and the image of reference numeral 410 are registered, and accordingly, the image of reference numeral 410 refers to the reference image that is a reference for the image registration, and the image of reference numeral 405 refers to the target image that is a target for the image registration.

In FIG. 4, the feature point extracting unit 330a each extracts the feature points from the reference image 410 and the target image 405, where reference number 415 is a diagram illustrating the feature points extracted from the target image 405, and reference numeral 420 is a diagram illustrating the feature points extracted from the reference image 410.

The feature extraction of the respective images refers to extracting characterized points from the respective images, and as an example, points at which the image brightness value suddenly changes, such as edges of pixels or corner points in the images may correspond to the feature points. As algorithms for extracting the feature points of the respective images, a Harris scheme, a scale invariant feature transform (SIFT) scheme, an oriented fast and rotated brief (ORB) scheme, a features from accelerated segment test (FAST) scheme, and the like may be used.

An image of reference numeral 415 illustrates feature points determined as the feature points in the image of reference numeral 405 by applying the FAST scheme, and an image of reference numeral 425 illustrates feature points determined as the feature points in the image of reference numeral 410 by applying the FAST scheme.

Reference number 415a illustrates one of the feature points extracted from reference numeral 415, and reference numeral 415b illustrates a first feature point group in which the plurality of feature points extracted from reference numeral 415 are grouped. In addition, reference number 420a illustrates one of the feature points extracted from reference numeral 420, and reference numeral 420b illustrates a second feature point group in which the plurality of feature points extracted from reference numeral 420 are grouped.

According to an exemplary embodiment of the present invention, when the feature point extracting unit 330a completes the extraction of the feature points such as reference numerals 415 and 420, the feature point matching unit 330b matches the feature points of the reference image and the target image using the first feature point group 415b extracted from the reference image and the second feature point group 420b extracted from the target image such as reference numeral 430. The feature point matching according to the present invention refers to matching the feature points extracted from the respective images to each other to find common feature points existing between the reference image and the target image, and may use a random sample consensus (RANSAC) scheme. The RANSAC scheme is a method of selecting data in which a consensus is maximally formed by randomly selecting sample data from data, and is a method capable of more accurately matching the feature points by acquiring the data in which error and noise are minimized in the data.

Reference numeral 430 illustrates a matching relationship between the image 415 and the image 420 by matching the extracted feature points between the image 415 on which the feature points extracted from the target image 405 are marked and the image 420 on which the feature points extracted from the reference image 410 are marked. Examples of the method of matching the feature points of the respective images may include a least square method, M-estimator SAC (MSAC), maximum likelihood SAC (MLESAC), locally optimized RANSAC (LO-RANSAC), and the like other than the RANSAC scheme.

When the feature points of the reference image and the feature points of the target image are matched by the feature point matching unit 330b, the homography calculating unit 330c calculates a homography, which is a transformation matrix between the reference image and the target image, using information of matched pairs between the first feature point group 415b and the second feature point group 420b.

The homography is a transformation matrix for matching a target image of a 2D plane to the reference image. In order to determine the homography, at least four matched pointed are required in the respective images, and a relationship matrix H between the matched points is defined as a 3×3 matrix H as in <Equation 1>.

$$w\begin{bmatrix} x' \\ y' \\ 1 \end{bmatrix} = \begin{bmatrix} h11 & h12 & h13 \\ h21 & h22 & h23 \\ h31 & h32 & h33 \end{bmatrix}\begin{bmatrix} x \\ y \\ 1 \end{bmatrix}$$ [Equation 1]

Here, x and y denote feature point coordinates of the reference image, and '1' means that the reference image and the target image are homogenous to each other. W, which is a weight, is defined as a constant, not '0'. The 3×3 matrix is the transformation matrix H.

FIG. 6 is a diagram illustrating a matching relationship between the reference image and the target image according to an exemplary embodiment of the present invention. In FIG. 6, reference numeral 600 denotes a reference image, reference numeral 605 denotes a target image, and reference numeral 610 illustrates that a matching relationship between a feature point matrix (x, y, 1) of the reference image and a feature point matrix (x', y', 1) of the target image exists using the calculated homography matrix.

The image registration unit 330d converts the target image 410 to be registered to the reference image 405 using the homography calculated by the homography calculating unit 330c.

Specifically, in FIG. 5, reference numeral 505 denotes the reference image 410 in FIG. 4 and reference numeral 510 denotes an image obtained by converting the target image of reference numeral 405 in FIG. 4 using the homography matrix calculated by the homography calculating unit 330c. In addition, the image registration unit 330d registers the reference image 505 and the converted target image 510 as in reference numeral 515 of FIG. 5. As illustrated in FIG. 5, the image registration unit 330d performs the registration based on the matched feature points of the respective images and naturally registers two different images by blending different images.

The transparency processing unit 330e performs a transparency process for each of the reference image and the target image which are registered by the image registration unit 330d.

Figure 9:
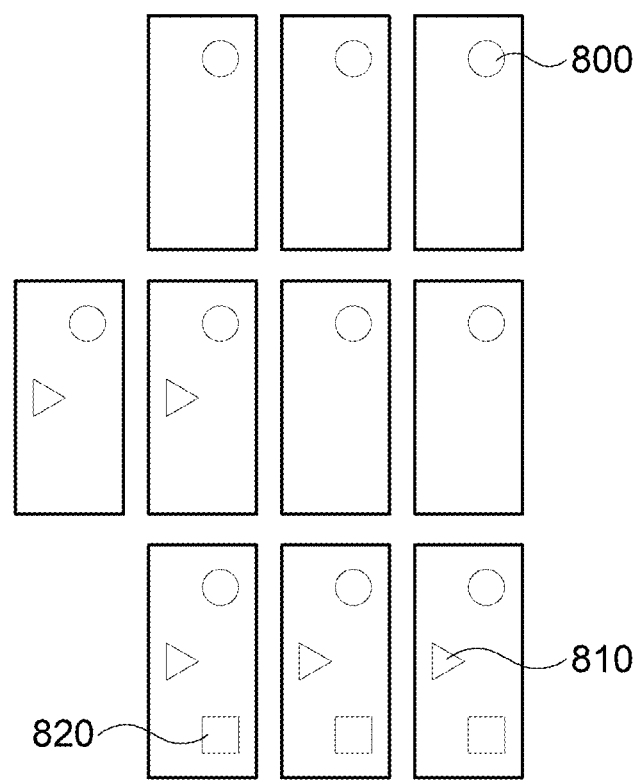
Figure 10:
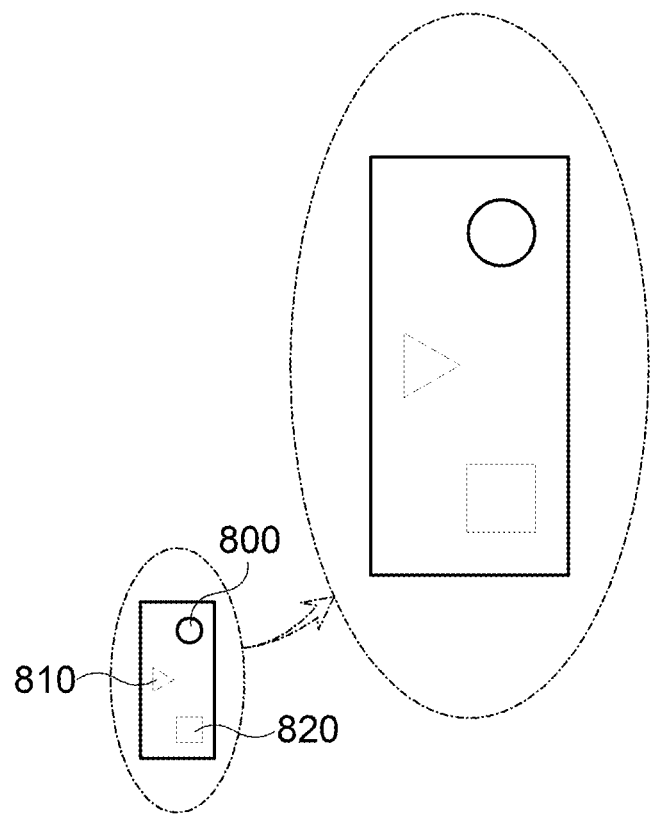

An operation of performing the transparency process by the transparency processing unit 330e according to an exemplary embodiment of the present invention will be described in detail with reference to FIGS. 8 to 11. The transparency process performed by the transparency processing unit 330e according to the present invention may be performed as in a method described in FIGS. 8 to 11. A total of ten images exist in FIG. 8, a first figure 800 of a circular shape exists in all of the ten images, a second figure 810 of a triangular shape exists in five images, and a third figure 820 of a quadrangular shape exists in three images. In this state, when the respective images are converted with a predetermined transparency, pixel values of the first to third figures 800, 810, and 820 decrease as illustrated in FIG. 9, thereby causing a blurring effect. Thereafter, when the respective images which are transparency-processed are overlapped with each other, as illustrated in FIG. 10, the first figure 800 has the same clear shape as before the transparency process, but the second FIG. 810 and the third FIG. 820 have lower definition than before the transparency process.

As described above, a method of performing a transparency process for the target image in the transparency processing unit 330e according to an exemplary embodiment of the present invention includes performing an image processing such that a transparency target image has a pixel value smaller than the pixel value of the original image by multiplying each pixel value (0 to 255) of the transparency target image by a predetermined constant. In general, R, G, and B pixel values of each pixel have values of 0 to 255, and when the pixel value has a small value, each pixel is visually blurred, and as a result, the entire image is also blurred.

Figure 11:
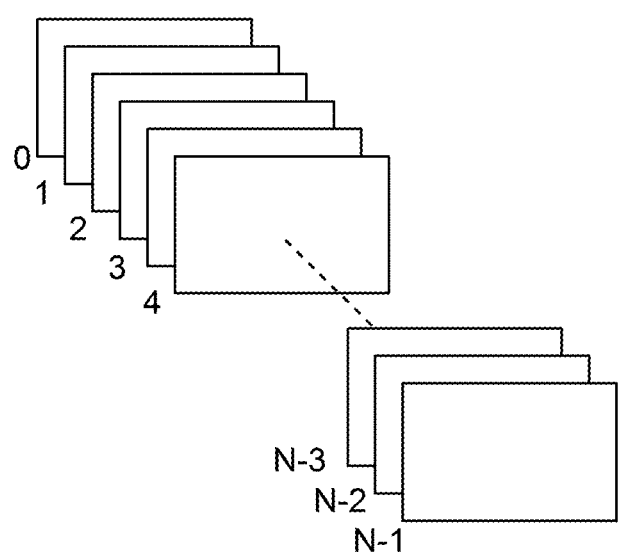

As illustrated in FIG. 11, according to an exemplary embodiment of the present invention, assuming that N images are registered, when it is assumed that transparency of images for which the transparency process is not performed is '1', the transparency process may be performed by multiplying pixel values of the respective image to be transparentized by 1/N. FIG. 9 illustrates transparency of each image of a case of multiplying a pixel of each image by 1/10 because the total number of transparency target images is ten. Here, in FIG. 11, a 0-th image is the reference image, and first to N−1-th images are the target images converted by the homography.

When the N images transparentized as described above are registered, the static objects existing in each image remain on the registered image as it is, but the dynamic objects disappear. That is, when the respective images are transparentized and then registered, since the pixel corresponding to the static object in each image is in a state in which the transparency multiplied by the same constant is applied, in a case in which the respective pixel values are added, the added pixel value is equal to an original pixel value or is close thereto, and as a result, the respective image also exists on the registered image as it is.

An operation of extracting the static object through the transparency process according to an exemplary embodiment of the present invention will be again described in detail. First, a pixel value for each of pixels of the registered image generated by registering the reference image and the target image converted according to the homography is calculated. Here, the calculated pixel value for each of the pixels of the registered image is equal to an average value of each of pixels of the N registered images.

In addition, standard deviations of the calculated pixel value of the registered image, the pixel value of the acquired reference image, and the pixel values of the converted target images are calculated for each of the pixels. The image processing apparatus 300 according to an exemplary embodiment of the present invention may determine a pixel having a value within a predetermined threshold value among the calculated standard deviations as a pixel configuring the static object.

On the contrary, the image processing apparatus 300 according to an exemplary embodiment of the present invention may determine a pixel having a value exceeding a predetermined threshold value among the calculated standard deviations as a pixel configuring the dynamic object. With such a scheme, the image processing apparatus 300 may classify the static object and the dynamic object from the registered image by calculating the standard deviations of the pixel values of the respective image and the pixel values of the registered image.

As such, the reason that the image processing apparatus 300 may classify the static object and the dynamic object from the average value for each of the pixels of the registered image is because the static object exists per each acquired image and a change of the pixel value for each of the respective images is small, such that the standard deviation of the pixel values included in the static object is lower than a predetermined threshold value.

On the other hand, since the dynamic object does not exist per the acquired image but exists only in some images, a change of the pixel value for each of the respective images is large, and accordingly, the standard deviation of the pixel values included in the dynamic object is higher than the predetermined threshold value. Here, the predetermined threshold value may be determined by an experiment.

In addition, the background other than the roads, the traffic lights, the crosswalks, and the buildings may exist in the static objects extracted according to an exemplary embodiment of the present invention. In this case, according to the present invention, in order to create the map, it is necessary to identify only the static objects to be reflected to the actual road data among the extracted static objects through an additional method, where the extracted static objects may be identified through a deep learning or a machine learning. Therefore, the controlling unit 305 of the image processing apparatus 300 according to an exemplary embodiment of the present invention may separate only the static objects such as the traffic lights, the roads, the crosswalks, and the like necessary to create or update the map data from the extracted static objects through the deep learning or the machine learning.

In FIG. 9, in a case in which the transparency processing unit 330e multiplies the pixel value of each image by 1/10 for the transparency process of each image and registers ten images, it may be confirmed that the first figure 800 exists in the same way as before performing the transparency process, but the second and third figures 810 and 820 disappear as compared to before performing the transparency process, as illustrated in FIG. 10. FIG. 10 illustrates a case in which the image registration for ten images is performed, but when an infinite number of images are overlapped, the dynamic objects having a large change of the pixel value between the images will be recognized as nonexistent.

The contents of overlapping the respective images will be described using <Equation 2> below.

$$A(t)=\alpha(A(t-1))+(1-\alpha)f(t), 1 \leq t \leq N-1 \quad \text{[Equation 2]}$$

Here, A(t) uses a t−1-th image and a t-th image as average images obtained for t time. Further, α, which is a weight, has a value of 0.5 and refers to add a 50% pixel value of the t-1-th image and a 50% pixel value of the t-th image. Further, f(t) denotes the t-th image.

As an example, Equation 2 will be applied as follows.

$$A(1)=\alpha f(0)+(1-\alpha)f(1),$$

$$A(2)=\alpha(A(1))+(1-\alpha)f(2),$$

$$A(3)=\alpha(A(2))+(1-\alpha)f(3)$$

Further, the image processing apparatus 300 may perform an image processing using the images received in units of predetermined period such as one day or one week, and may perform the image processing using all of the received images or using an arbitrarily selected image. As an example, as illustrated in FIG. 11, if there are N images from 0 to N−1 acquired by photographing a specific region for one day by the first to third vehicles 100, 110, and 120 and transmitted to the image processing apparatus 300, the image processing apparatus 300 may also extract the static objects by performing the transparency process and registration for the entirety of the images from 0 to N−1, and may also extract the static objects only using some of the entirety of the images.

A method of extracting, by the controlling unit 305 of the image processing apparatus 300, the static objects such as the buildings, the roads, and the like from the images transparentized by the transparency processing unit 330e according to the contents described above will be described.

In FIG. 7, reference numerals 740 and 750, which are images photographed at a predetermined time interval in a specific region, are image photographed by the cameras or smart phones mounted in the vehicles. The photographed images include a building 700, a road 720, and a traffic light 730 as the static objects and include vehicles 710 as the dynamic objects. The image processing apparatus 300 may acquire a plurality of images related to the specific region by classifying only the images related to the specific region using acquisition information of the images received from the electronic apparatus 200 for a predetermined time (e.g., 'one day').

In addition, when the image processing apparatus 300 performs the image registration and the transparency process for the received images, the static objects such as the building 700, the road 720, and the traffic light 730 exist as it is, but the dynamic objects such as the vehicles disappear, as illustrated by reference numeral 760. According to an exemplary embodiment of the present invention, as the number of the registered images is increased, the static object and the dynamic object may be more clearly classified when the transparency process is performed.

The image synthesizing unit 330f performs synthesis for the transparency-processed images and transmits the synthesized image to the controlling unit 305.

The storing unit 320 includes a map data storing unit 320a and a received image storing unit 320b. The map data storing unit 320a store map data which is previously created and also store map data which is updated by the controlling unit 305. The received image storing unit 320b stores the image received through the receiving unit 310.

The controlling unit 305 according to an exemplary embodiment of the present invention performs a control so that the images received through the receiving unit 310 are stored in the received image storing unit 320b, and updates the map data when it is necessary to update the stored map data to store the updated map data in the map data storing unit 320a.

In addition, the controlling unit 305 extracts the static objects from the images transparency-processed by the image processing unit 330, compares the extracted static objects with objects on the map data which is previously stored in the map data storing unit 320a, and updates the map data when the objects on the map data which is previously stored and the extracted static objects are different.

Specifically, the controlling unit 305 confirms position information of the extracted static objects and examines whether or not the objects different from the extracted static objects exist at positions corresponding to the position information of the static objects confirmed in the map data which is previously stored. In addition, as a result of the examination, if the different objects exist, the controlling unit 305 reflects the extracted static objects to the map data which is previously stored corresponding to the position information and update the map data to store it in the map data storing unit 320a.

The images received by the image processing apparatus 300 from the vehicles positioned on the road according to an exemplary embodiment of the present invention include fixed geographic features, static objects such as lane information marked on the road such as left turn/right turn, and dynamic objects such as other vehicles positioned on the road, pedestrians, and the like. Therefore, it is important to exclude unnecessary dynamic objects except for the static objects from the images received when the image processing apparatus 300 generates or updates the map data according to an exemplary embodiment of the present invention.

However, since the static objects in the received images are covered by the dynamic objects, a case in which it is difficult for the image processing apparatus 300 to identify the static objects may occur. Therefore, according to an exemplary embodiment of the present invention, in order to solve the above-mentioned problem, the image processing apparatus 300 registers the reference image and the target image, performs the transparency process, and then extracts the static objects.

FIG. 12 is a diagram illustrating an operation of extracting static objects using the acquired images on an actual road according to an exemplary embodiment of the present invention.

In FIG. 12, a right turn lane marking 1201 exists on a road of reference numeral 1205 but a vehicle exists on a road of reference numeral 1210 in which it is difficult to extract the right turn lane marking 1201. In this case, when the image processing is performed according to an exemplary embodiment of the present invention, the vehicle, which is the dynamic object, appears to be dim, but the extraction of the right turn lane marking 1201, which is the static object, may be easily identified, as in reference numeral 1215. Therefore, according to an exemplary embodiment of the present invention, since the image processing apparatus 300 may confirm the right turn marking 1201 existing on the road, it may update the map data so as to reflect the corresponding contents when the right turn marking 1201 does not exist in the map data which is previously created.

The transmitting unit 315 transmits the map data stored in the storing unit 320 or the map data updated by the controlling unit 305 to the electronic apparatus 200 of the vehicle or the smartphone of the user. Further, the transmitting unit 315 may also transmit a message requesting a transmission of images acquired at a current position to the electronic apparatuses 200 of the vehicles.

Further, the exemplary embodiment of the present invention describes that the transparency processing unit 320e performs the transparency process after the image registration is performed by the image registration unit 320*d*, but is not limited thereto.

According to another exemplary embodiment of the present invention, the transparency processing operation may also be performed after determining the images to be registered by the controlling unit 305, may also be performed after the feature points are extracted, and may also be performed after the homography is calculated.

Figure 13:
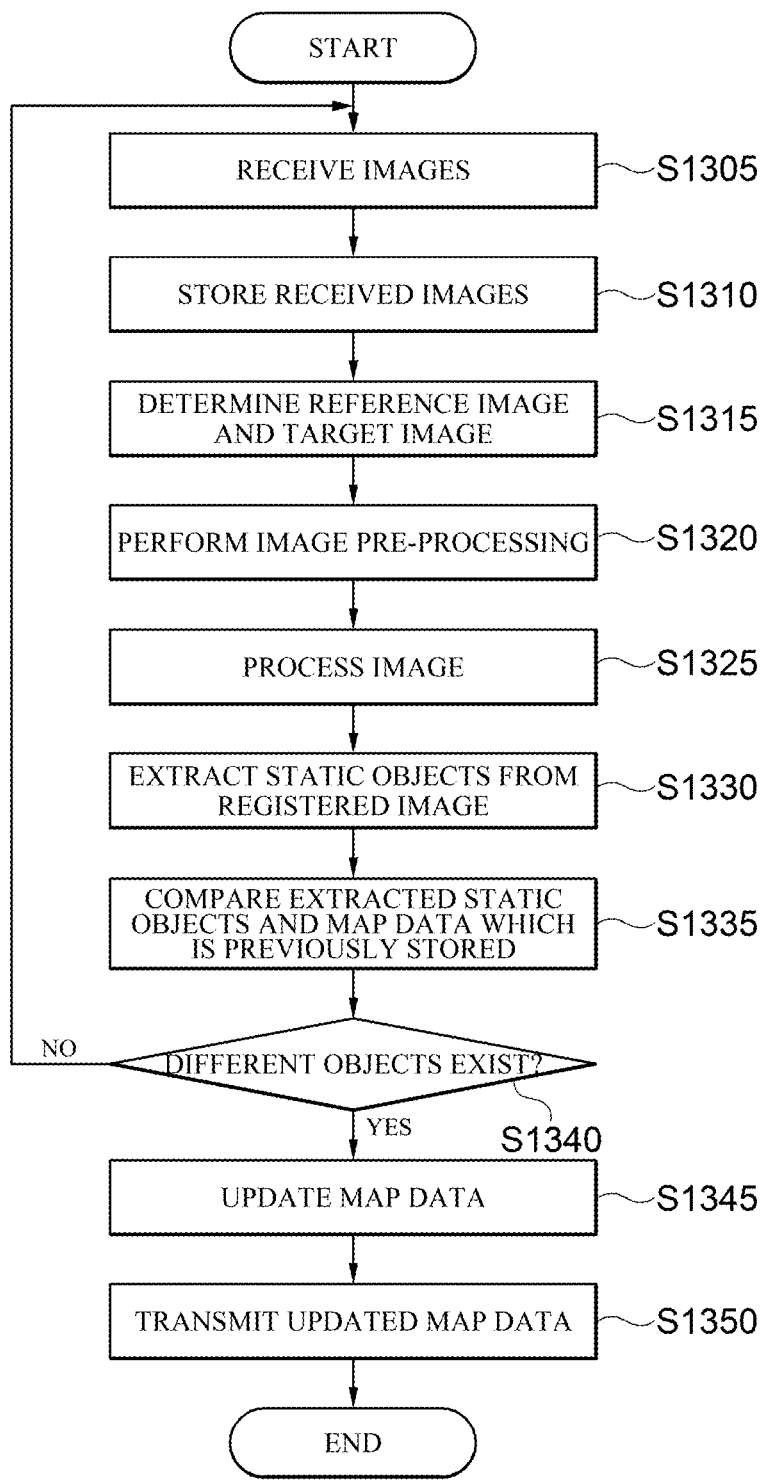
FIG. 13 is a diagram illustrating an operation flow of an image processing apparatus according to an exemplary embodiment of the present invention.

FIG. 13 is an operation flowchart of an image processing apparatus according to an exemplary embodiment of the present invention.

The image processing apparatus 300 receives images in an operation (S1305) and stores the received images in the storing unit in an operation (S1310). In addition, the image processing apparatus 300 determines the reference image and the target image in an operation (S1315) and performs an image pre-processing in an operation (S1320). The image pre-processing operation includes an image processing to unify the color, brightness, and definition of the image so as not to be influenced by recognition of the image and a synthesizing process with other images, and mainly uses functions such as Curves, Levels, Brightness/Contrast, Color Balance, Shadows/Highlight, and the like.

If the image pre-processing operation is completed, the image processing apparatus 300 performs an image processing operation according to an exemplary embodiment of the present invention in an operation (S1325). The image processing operation performed in the operation (S1325) will be descried with reference to FIG. 14.

If the image processing in the operation (S1325) is completed, the image processing apparatus 300 extracts static objects from the registered image in an operation (S1330) and compares the extracted static objects with the map data which is previously store in an operation (S1335). Specifically, the image processing apparatus 300 confirms whether or not objects different from the extracted static objects exist at a position corresponding to position information of the static object confirmed in the map data which is previously stored.

As a result of the confirmation of the operation (S1335), if the objects different from the static objects extracted from the map data which is previously stored exist in an operation (S1340), the image processing apparatus 300 update the map data in an operation (S1345) and transmits the updated map data to the electronic apparatus or the smartphone of the user in an operation (S1350).

Figure 14:
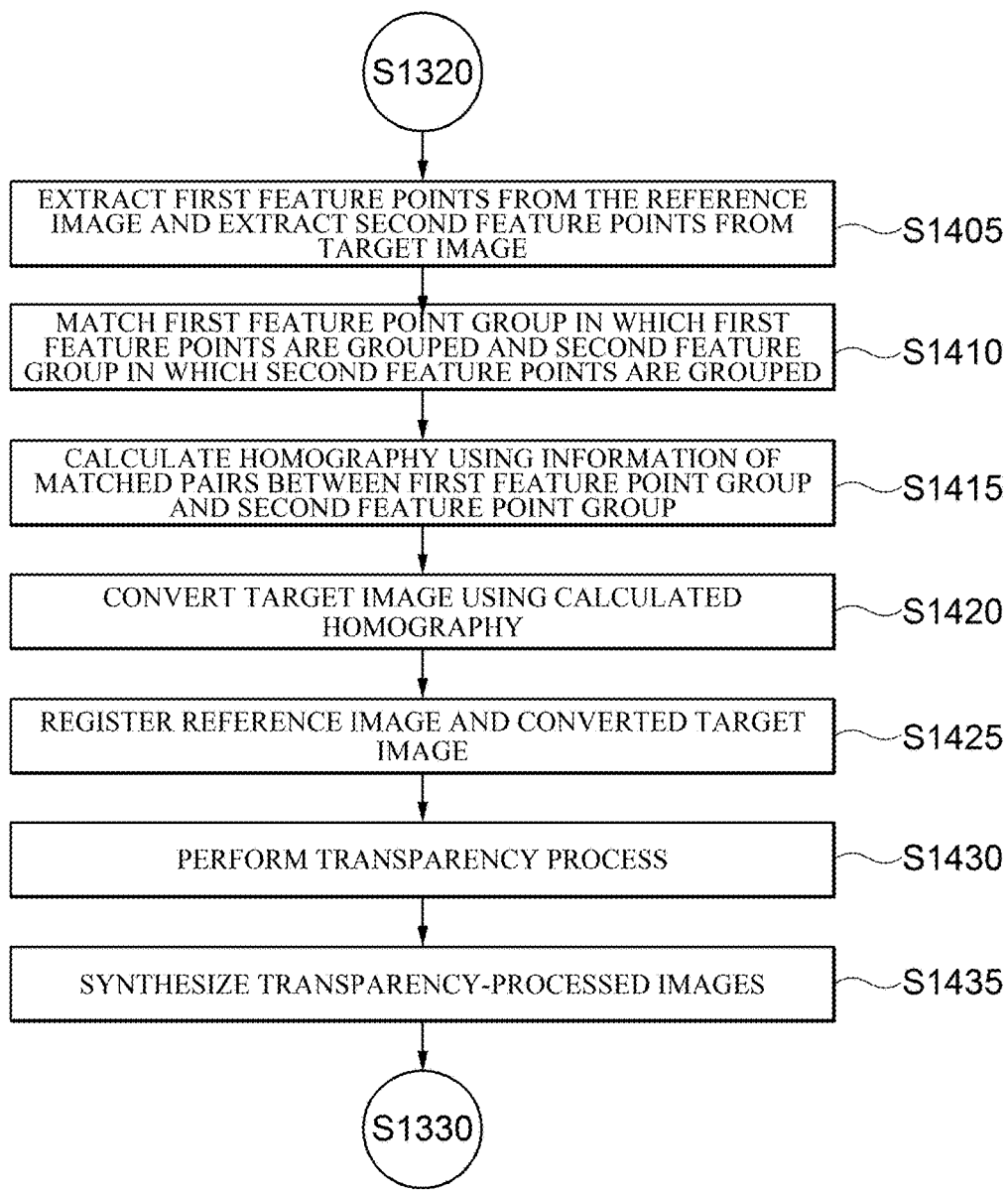
FIG. 14 is a diagram illustrating an operation (S1325) of FIG. 13 in detail.

FIG. 14 is a flowchart illustrating the operation (S1325) of FIG. 13 in detail.

The image processing apparatus 300 extracts first feature points from the reference image and extracts second feature points from the target image in an operation (S1405). In addition, the image processing apparatus 300 matches a first feature point group in which the first extracted feature points are grouped and a second feature point group in which the second extracted feature points are grouped in an operation (S1410), and calculates a homography using information of matched pairs between the first feature point group and the second feature point group in an operation (S1415).

The image processing apparatus 300 converts the target image using the homography calculated in the operation (S1415) in an operation (1420), and registers the reference image and the converted target image in an operation (S1425).

In addition, the image processing apparatus 300 performs the transparency process for the registered images in an operation (S1430) and then synthesizes the transparency-processed images in an operation (S1435). The operation (S1435) is an optional operation and may not also be performed as needed. That is, when the image processing apparatus 300 extracts the static objects from the registered images according to an exemplary embodiment of the present invention, the image processing apparatus 300 may also extract the static objects in a state in which the transparency process is completed and may also extract the static objects after the transparency process is performed and the image synthesis is also completed.

Figure 15:
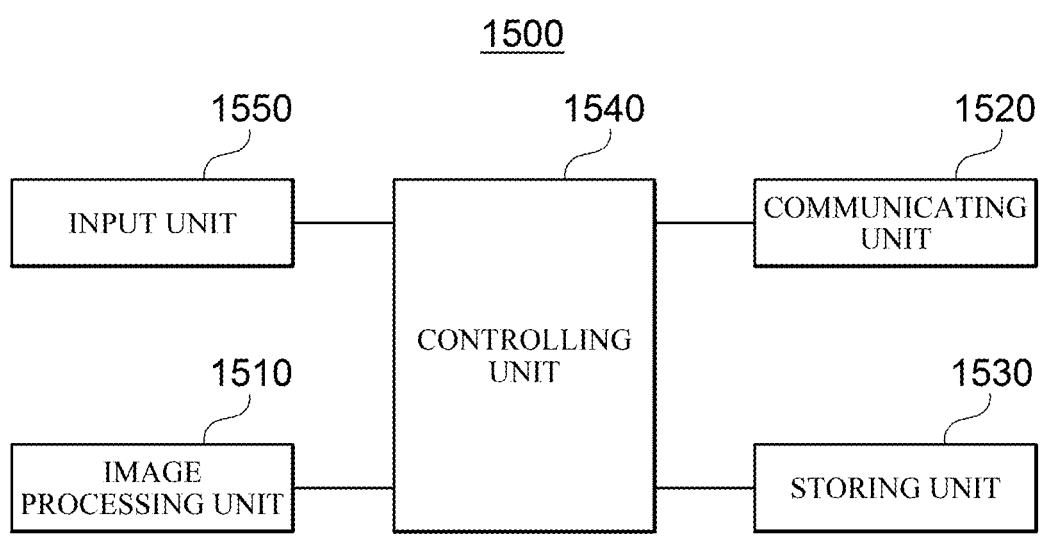
FIG. 15 is a diagram illustrating a block configuration of an image processing apparatus for creating a map according to another exemplary embodiment of the present invention.

FIG. 15 is a block configuration diagram of an image processing apparatus for creating a map according to another exemplary embodiment of the present invention. An input unit 1550 may receive a command for performing an operation of an image processing apparatus 1500 from the user, and may include a keypad, a touch pad (resistive/capacitive), and the like.

An image processing unit 1510 processes images received from the vehicles positioned on the road and extracts a variety of information such as fixed geographic features, extending/closing of the road, or lane information such as a left turn/right turn from the received images.

A communicating unit 1520 performs communication with electronic apparatuses or mobile terminals such as smartphones included in the vehicles to receive the photographed images or transmit created map data to the electronic apparatuses or the mobile terminals. The communicating unit 1520 may perform communication in a wired communication scheme as well as various wireless communication schemes such as Bluetooth, Wi-Fi, wireless broadband, 3rd generation (3G), WCDMA scheme, long term evolution (LTE), and a 4th generation (4G) communication schemes.

A storing unit 1530 stores the images received by the electronic apparatuses or the mobile terminals such as the smartphones included in the vehicles, map data generated by a map creating server (not shown) or the image processing apparatus 1500, and instructions which are executable by the controlling unit 340 of the image processing apparatus 1500. As the storing unit 1530, various storing mediums such as a random access memory (RAM), a static random access memory (SRAM), a read only memory (ROM), an electrically erasable programmable read-only memory (EEPROM), a programmable read-only memory (PROM), a magnetic memory, a magnetic disk, an optical disc, and the like may be used.

A controlling unit 1540 performs a control to process the received image to generate the map data, or generate updated data for updating the map data, and transmit the generated map data to the electronic apparatuses or the mobile terminals such as the smartphones included in the vehicles through the communicating unit 1520.

Figure 16:
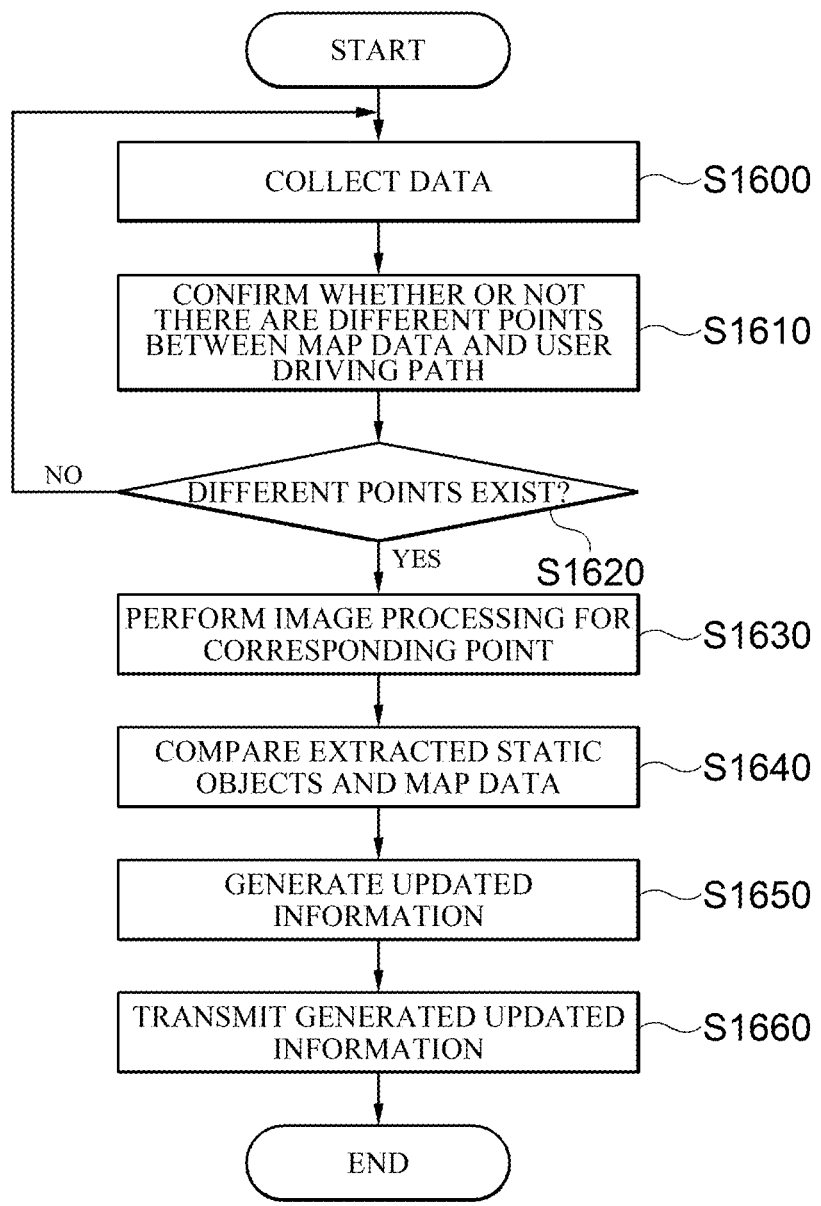
FIG. 16 is a diagram illustrating a method for creating a map of the image processing apparatus of FIG. 15.

FIG. 16 is a method flowchart illustrating a method for creating a map of the image processing apparatus of FIG. 15.

FIG. 16 relates to a case of updating map data which is previously stored when driving paths of the vehicles driving on the road are different from the map data which is previously stored. As an example, a case in which the road is a left turn no region on the map data which is previously stored, but the vehicle turns left, a case in which the vehicle is being driven even though there is no road in the map data which is previously stored, or the like may correspond to such a situation. Here, since the road or the lane information marked on the road corresponds to the static object, the map which is previously stored may be modified by the image processing method as described above.

Specifically, the image processing apparatus 1500 receives and stores a variety of data such as the images received from the electronic apparatuses of the vehicles driving on the road, user driving logs, and the like in an operation (S1600). Next, in an operation (S1610), the controlling unit 1540 of the image processing apparatus 1500 confirms whether or not there are different points between the map data such as the road, the lane information, and the like stored in the map data which is previously stored and the user driving contents by analyzing the user driving logs.

If there are the different points in an operation (S1620) (Yes in S1620), the controlling unit 1540 controls the image processing apparatus 1510 so as to perform the image processing for the corresponding point and extracts static objects such as the road and the lane information for the corresponding point in an operation (S1630). Here, it is preferred that the image processing apparatus 1500 performs the image processing operation when the images are acquired from the electronic apparatuses of the plurality of vehicles which are driven at the corresponding point.

Next, the controlling unit 1540 compares the extracted static objects with the map data to confirm whether to necessary to modify data for the static objects included in the map data in an operation (S1640), and generates update information for modifying the map data when it is necessary to modify the data for the static objects in an operation (S1650). The controlling unit 1540 modifies the map data using the update information generated in the operation (S1650) in an operation (S1660) and transmits the update information generated in the operation (S1660) to the electronic apparatuses of the vehicles which are driven on the road. Here, the controlling unit 1540 may transmit the map data to the electronic apparatus capable of using the map data such as the smartphone or the like through the communicating unit 1520 so that the user may conveniently use the map data.

Figure 17:
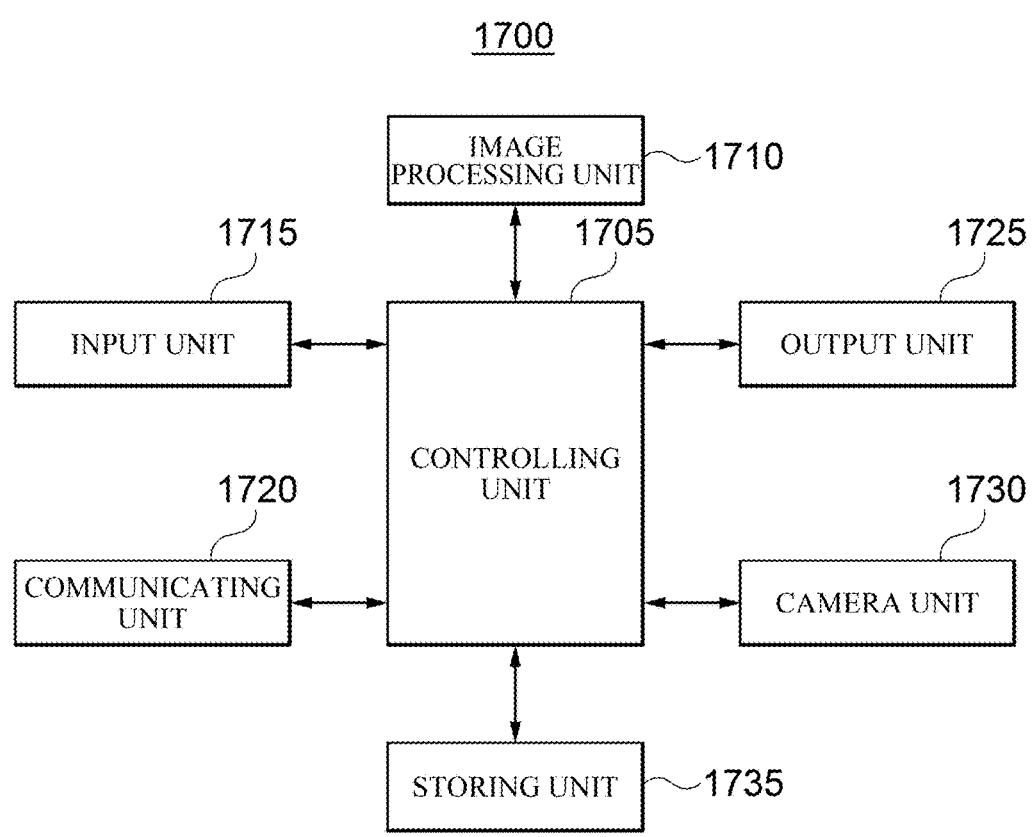
FIG. 17 is a diagram illustrating a block configuration of an electronic apparatus according to still another exemplary embodiment of the present invention.

FIG. 17 is a block configuration diagram of an electronic apparatus according to still another exemplary embodiment of the present invention.

An input unit 1715 transmits a variety of control commands input from the user to a controlling unit 1705, and may be a touch screen panel, a keyboard, or a mouse. A communicating unit 1720 performs communication with the image processing apparatus according to an exemplary embodiment of the present invention or other electronic apparatuses. An output unit 1725, which is a configuration for providing information to the user in sound or visual way, may be a display or a speaker. A camera unit 1730 photographs subjects by a control of the controlling unit 1705.

The image processing unit 1710 may perform image processing such as feature point extraction, transparency process, or image registration for the images photographed by the camera unit 1730 as described in the present specification to allow the controlling unit 1705 to extract the static objects.

A storing unit 1735 stores instructions and map data which may be performed by the controlling unit 1705 so that the electronic apparatus 1700 may be operated.

In a case in which the vehicle in which the electronic apparatus 1700 according to another exemplary embodiment of the present invention is mounted drives on the road, the controlling unit 1705 performs a control so that the images are acquired through the camera unit 1730 and loads the map data stored in the storing unit 1735. In addition, the controlling unit 1705 performs a path guidance through the output unit 1725 using the loaded map data and a position of the vehicle which is currently measured, and extracts the static objects by performing the image processing for the images acquired by the camera unit 1730 by the image processing unit 1710.

In addition, the controlling unit 1705 compares the extracted static objects with the map data, examines whether or not the extracted static objects exist in the map data used for the path guidance, and request an update of the map data stored in the storing unit 1735 to the image processing apparatus through the communicating unit 1720 when the extracted static objects do not exist in the map data.

If the updated map data is received through the communicating unit 1720, the controlling unit 1735 updates the map data which is previously stored in the storing unit 1735.

Figure 18:
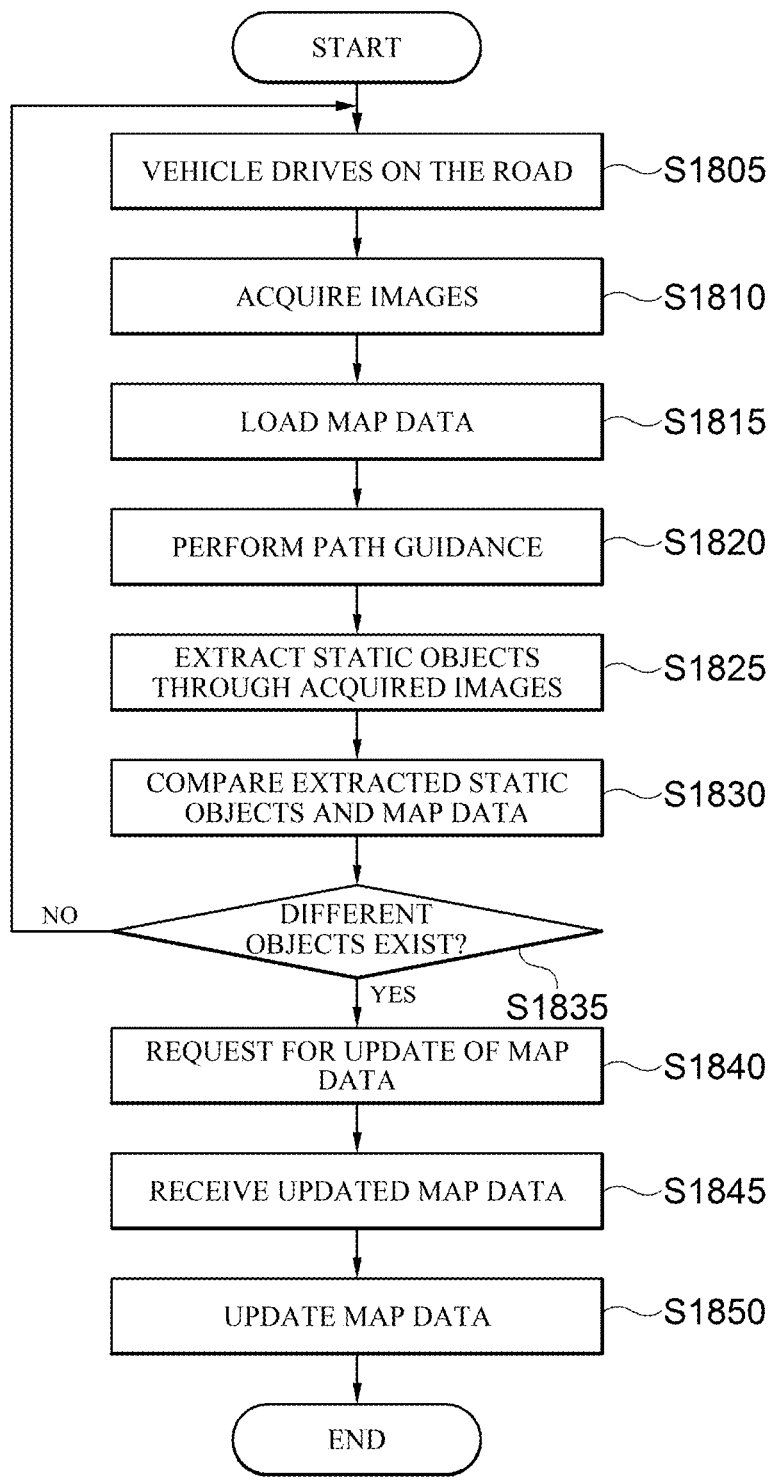
FIG. 18 is a diagram illustrating an operation flow of the electronic apparatus of FIG. 17.

FIG. 18 is a flowchart of an operation of the electronic apparatus 1700 of FIG. 17.

If the vehicle drives on the road (S1805), the electronic apparatus 1700 installed in the vehicle acquires images in an operation (S1810) and loads map data in an operation (S1815). In addition, the electronic apparatus 1700 performs a path guidance using the loaded map data and a position of the vehicle which is currently measured in an operation (S1820), and extracts static objects by performing an image processing for the acquired images in an operation (S1825).

The electronic apparatus 1700 compares the extracted static objects with the map data in an operation (S1830) and examines whether or not the extracted static objects exist in the map data used for the path guidance in an operation (S1835). As a result of the examination of the operation (S1835), if the static object different from the extracted static objects exist in the map data, the electronic apparatus 1700 requests an update of the map data which is previously stored to the image processing apparatus in an operation (S1840). If the updated map data is received in an operation (S1845), the electronic apparatus 1700 updates the map data which is previously stored in an operation (S1850).

Figure 19:
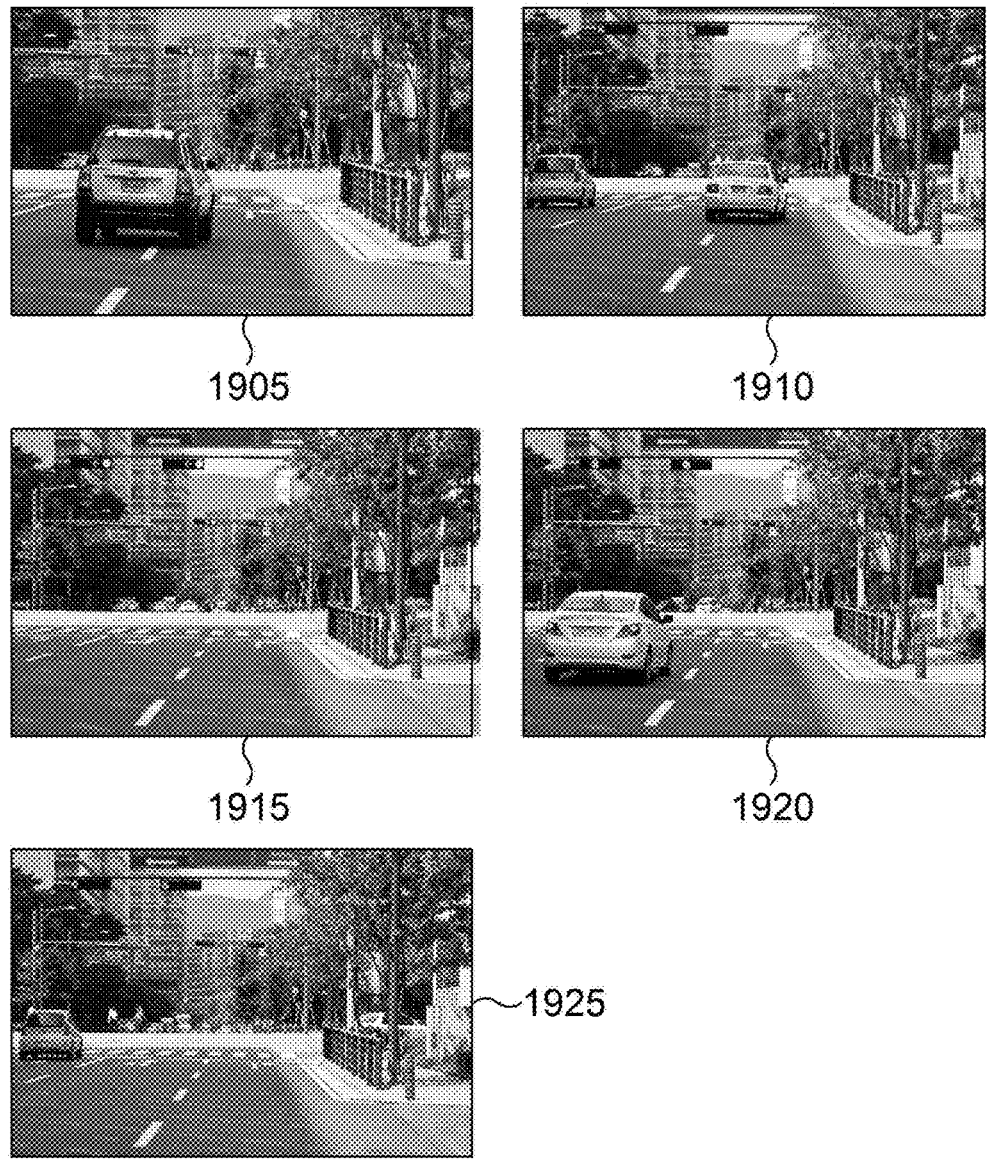
FIGS. 19 and 20 are diagrams illustrating a transparency process for five images.
Figure 20:
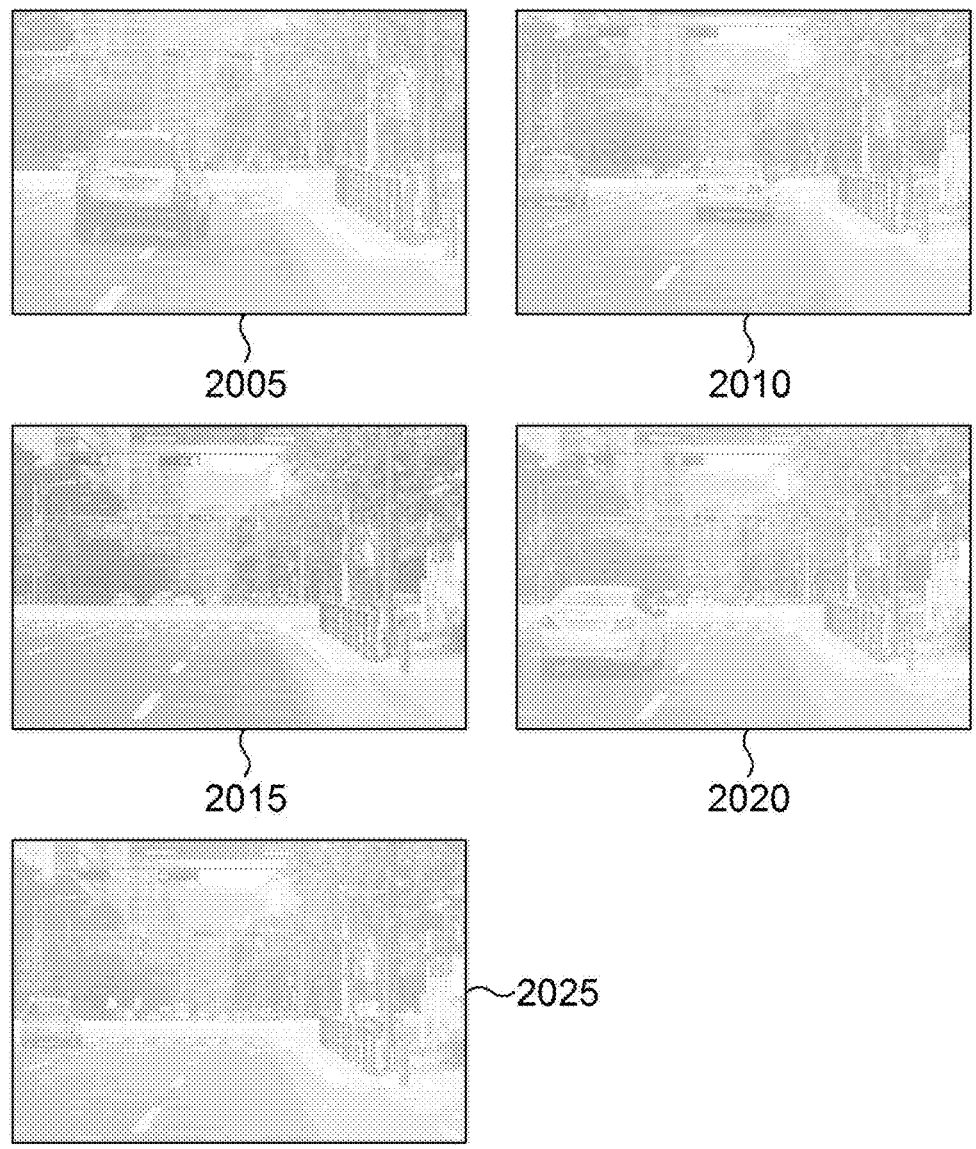

FIGS. 19 and 20 are diagrams illustrating a transparency process for five images according to an exemplary embodiment of the present invention.

FIG. 19 illustrates a total of five images (reference numerals 1905, 1910, 1915, 1920, and 1925) acquired at the same point according to an exemplary embodiment of the present invention and reference numerals 2005, 2010, 2015, 2020, and 2025 of FIG. 20 illustrate results obtained by performing a transparency process for each of the images of reference numerals 1905, 1910, 1915, 1920, and 1925 of FIG. 19. Since the total number of images to be targeted to the transparency process is 5 (N=5) in FIGS. 19 and 20, a constant multiplied with a pixel value of each of the images of reference numerals 1905, 1910, 1915, 1920, and 1925 of FIG. 19 to perform the transparency process according to an exemplary embodiment of the present invention is ⅕. That is, the respective images of FIG. 20 are the transparency-processed images obtained by multiplying the respective pixel values of the respective images of FIG. 19 by ⅕.

Figure 21:
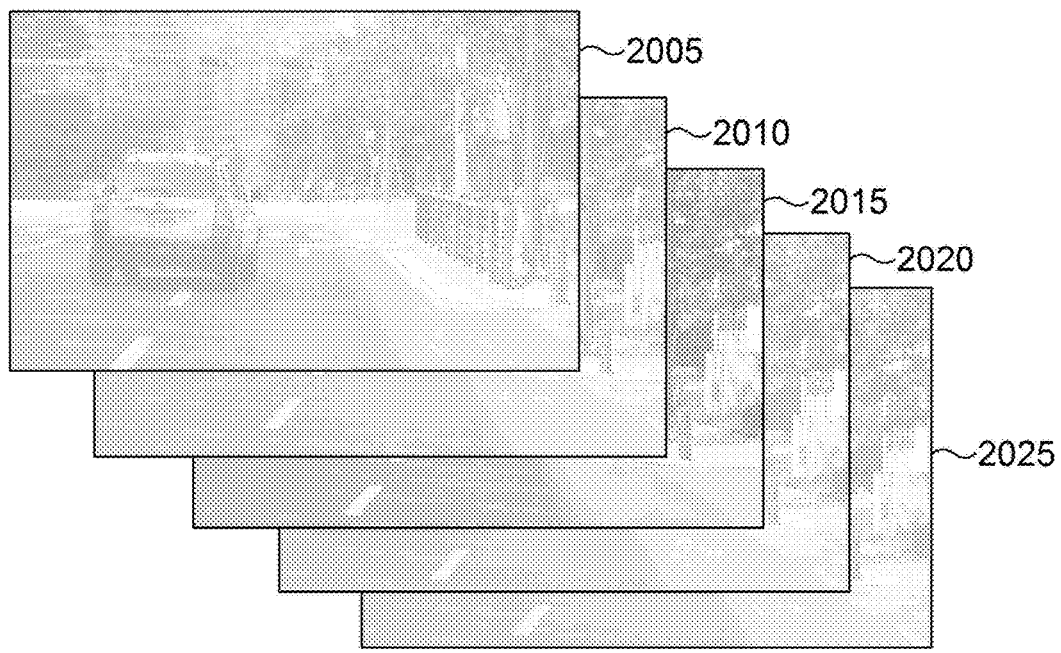
FIG. 21 is a diagram illustrating an image registration of the transparency-processed images of FIG. 20.
Figure 22:
FIG. 22 is a diagram illustrating a result of the registration of thee images of FIG. 21.

In addition, FIG. 21 is a diagram illustrating an image registration of the transparency-processed images of FIG. 20 and FIG. 22 is a diagram illustrating a result of the image registration of FIG. 21, where it may be seen that the vehicles, which are the dynamic objects, disappear, while roads, lane marking lines, crosswalks, traffic lights, and the like, which are static objects, exist as it is. According to the present invention, the static objects may be extracted from the images in this method and used to update or create the map data.

Meanwhile, the above-mentioned example illustrates that the transparency processing unit performs the transparency process by multiplying the respective pixel values (0 to 255)

of the transparency target images by a predetermined constant and performing the image processing so that the respective pixel values (0 to 255) of the transparency target images have a pixel value smaller than the original pixel values of the images, but is not limited thereto. According to another implementation of the present invention, the transparency processing unit may adjust transparency of the corresponding image by adjusting an ALPHA (A) value corresponding to a transparency level in an RGBA value of the transparency target image. Here, the Alpha (A) value may be defined in advance and may also be updated periodically.

Further, the above-mentioned example illustrates that the static objects and the dynamic objects are extracted from the registered image by calculating the standard deviations of the pixel value of the registered image, the pixel value of the reference image, and the pixel value of the target image for each of the pixels, determining the pixels in which the calculated standard deviation is the predetermined value or less as the pixels for the static objects, and determining the pixels in which the calculated standard deviation exceeds the predetermined value as the pixels for the dynamic objects, but is not limited thereto. According to another implementation of the present invention, the static objects and the dynamic objects may also be classified by comparing an ALPHA (A) value in an RGBA value of the registered image with a predetermined transparency value.

Meanwhile, the control method according to various exemplary embodiments of the present invention described above may be implemented in a program so as to be provided to the server or devices. Accordingly, the respective apparatuses may be connected to the server or the device in which a program is stored to download the program.

Further, the control method according to various exemplary embodiments of the present invention described above may be implemented in the program and be stored and provided in various non-transitory computer-readable mediums. The non-transitory readable medium is not a medium that stores data for a short period of time, such as a register, a cache, a memory, or the like, but means a medium that semi-permanently stores data and is readable by a device. Specifically, the various applications or programs described above may be stored and provided in the non-transitory computer readable medium such as a compact disk (CD), a digital versatile disk (DVD), a hard disk, a Blu-ray disk, a universal serial bus (USB), a memory card, a read only memory (ROM), or the like.

According to the various exemplary embodiments of the present invention described above, it is possible to extract static objects positioned on the road through the images obtained by the cameras installed in the vehicles positioned on the road and to accurately and quickly create the map using the extracted static object.

Further, according to the various exemplary embodiments of the present invention described above, it is possible to remotely update the map data in real time by receiving the images obtained through the cameras of the vehicles positioned on the road in real time, unlike an existing map creating system through a survey.

Further, according to the various exemplary embodiments of the present invention described above, it is possible to provide the map service to which the newest road environment is applied to the users by transmitting the map data which is updated in real time to the vehicles positioned on the road.

Although exemplary embodiments of the present invention have been illustrated and described hereinabove, the present invention is not limited to the above-mentioned specific exemplary embodiments, but may be variously modified by those skilled in the art to which the present invention pertains without departing from the scope and spirit of the present invention as disclosed in the accompanying claims. These modifications should also be understood to fall within the scope of the present invention.

What is claimed is:

1. An image processing method comprising:
receiving images acquired from a plurality of vehicles positioned on a road;
storing the received images according to acquisition information of the received images;
determining a reference image and a target image based on images having the same acquisition information among the stored images;
performing an image registration using a plurality of feature points extracted from each of the determined reference image and target image;
performing a transparency process for each of the reference image and the target image which are image-registered;
extracting static objects from the transparency-processed image; and
comparing the extracted static objects with objects on map data which is previously stored and updating the map data when the objects on the map data which is previously stored and the extracted static objects are different from each other.

2. The image processing method of claim 1, wherein the performing of the image registration includes
extracting the plurality of feature points from each of the determined reference image and target image; and
performing the image registration for the determined images using the plurality of extracted feature points.

3. The image processing method of claim 1, wherein the plurality of feature points are points at which image brightness value suddenly changes in the reference image or the target image and are edges of pixels or corner points.

4. The image processing method of claim 2, wherein the transparency process multiplies R, G, and B pixel values of respective pixels included in the images for which the transparency process is to be performed by a predetermined value smaller than 1, and
the predetermined value is a reciprocal number of N, which is a total number of the images for which transparency process is to be performed.

5. The image processing method of claim 1, wherein the acquisition information includes at least one of information on positions at which the images are photographed, information on angles at which the images are photographed, and information on directions in which the images are photographed.

6. The image processing method of claim 2, wherein the extracting of the plurality of feature points includes
extracting a plurality of first feature points from the reference image; and
extracting a plurality of second feature points from the target image.

7. The image processing method of claim 6, wherein the performing of the image registration includes
performing a matching operation matching a first feature point group in which the plurality of first feature points are grouped and a second feature point group in which the plurality of second feature points are grouped;

calculating a homography using information of matched pairs between the first feature point group and the second feature point group through the matching operation;

converting the target image using the calculated homography; and registering the reference image and the converted target image.

8. The image processing method of claim 1, wherein the updating of the map data includes confirming position information of the extracted static objects;

examining whether or not objects different from the extracted static objects exist at a position corresponding to the confirmed position information of the static objects in the map data which is previously stored; and updating the map data by reflecting the extracted static objects to the map data which is previously stored corresponding to the position information, when the different objects exist as a result of the examination.

9. The image processing method of claim 1, further comprising transmitting the updated map data to the plurality of vehicles positioned on the road.

10. The image processing method of claim 1, wherein the extracting of the static objects includes calculating standard deviations of a pixel value of the registered image, a pixel value of the reference image, and pixel values of target images for each of pixels; and determining pixels of which the calculated standard deviation is a predetermined value or less as pixels for the static objects and determining pixels of which the calculated standard deviation exceeds the predetermined value as pixels for the dynamic objects.

11. The image processing method of claim 10, further comprising excluding the dynamic objects from the transparency-processed image, wherein in the updating of the map data, the map data is updated based on position information of the static objects in the registered image from which the dynamic objects are excluded.

12. An image processing apparatus comprising:

a receiving unit receiving images acquired from a plurality of vehicles positioned on a road;

a storing unit storing the received images according to acquisition information of the received images;

a controlling unit determining a reference image and a target image based on images having the same acquisition information among the stored images; and an image processing unit performing an image registration using a plurality of feature points extracted from each of the determined reference image and target image and performing a transparency process for each of the reference image and the target image which are image-registered, wherein the controlling unit extracts static objects from the transparency-processed image, compares the extracted static objects with objects on map data which is previously stored, and updates the map data when the objects on the map data which is previously stored and the extracted static objects are different from each other.

13. The image processing apparatus of claim 12, wherein the image processing unit generates one synthesized image by extracting the plurality of feature points from each of the determined reference image and target image and performing the image registration for the determined images using the plurality of extracted feature points.

14. The image processing apparatus of claim 12, wherein the plurality of feature points are points at which image brightness value suddenly changes in the reference image or the target image and are edges of pixels or corner points.

15. The image processing apparatus of claim 13, wherein the transparency process multiplies R, G, and B pixel values of respective pixels included in the images for which the transparency process is to be performed by a predetermined value smaller than 1, and the predetermined value is a reciprocal number of N, which is a total number of the images for which the transparency process is to be performed.

16. The image processing apparatus of claim 12, wherein the acquisition information includes at least one of information on positions at which the images are photographed, information on angles at which the images are photographed, and information on directions in which the images are photographed.

17. The image processing apparatus of claim 13, wherein the image processing unit includes a feature point extracting unit extracting a plurality of first feature points from the reference image and extracting a plurality of second feature points from the target image;

a feature point matching unit performing a matching operation matching a first feature point group in which the plurality of first feature points are grouped and a second feature point group in which the plurality of second feature points are grouped;

a homography calculating unit calculating a homography using information of matched pairs between the first feature point group and the second feature point group through the matching operation;

an image registration unit converting the target image using the calculated homography and registering the reference image and the converted target image; and a transparency processing unit performing a transparency process for the registered images.

18. The image processing apparatus of claim 12, wherein the controlling unit confirms position information of the extracted static objects, examines whether or not objects different from the extracted static objects exist at a position corresponding to the confirmed position information of the static objects in the map data which is previously stored, and updates the map data by reflecting the extracted static objects to the map data which is previously stored corresponding to the position information, when the different objects exists as a result of the examination.

19. The image processing apparatus of claim 12, further comprising a transmitting unit transmitting the updated map data to the plurality of vehicles positioned on the road.

20. A computer readable recording medium in which a program for executing an image processing method is recorded, wherein the image processing method includes receiving images acquired from a plurality of vehicles positioned on a road;

storing the received images according to acquisition information of the received images;

determining a reference image and a target image based on images having the same acquisition information among the stored images;

performing an image registration using a plurality of feature points extracted from each of the determined reference image and target image;

performing a transparency process for each of the reference image and the target image which are image-registered;
extracting static objects from the transparency-processed image; and
comparing the extracted static objects with objects on map data which is previously stored and updating the map data when the objects on the map data which is previously stored and the extracted static objects are different from each other.

* * * * *